US008856048B2

(12) United States Patent  
Calcaterra et al.

(10) Patent No.: US 8,856,048 B2
(45) Date of Patent: Oct. 7, 2014

(54) METHOD, SYSTEM, AND COMPUTER PROGRAM PRODUCT FOR AUTOMATICALLY APPLYING A PREDICTIVE TEMPORAL PROFILE TO COMPUTER RESOURCE MANAGEMENT DECISIONS

(75) Inventors: Jeffrey A. Calcaterra, Research Triangle Park, NC (US); Andrew L. Hanson, Rochester, MN (US); Gregory R. Hintermeister, Rochester, MN (US); Govindaraj Sampathkumar, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 1215 days.

(21) Appl. No.: 12/580,023

(22) Filed: Oct. 15, 2009

(65) Prior Publication Data
US 2011/0093413 A1  Apr. 21, 2011

(51) Int. Cl.
G06F 11/34 (2006.01)

(52) U.S. Cl.
CPC ........ G06F 11/3447 (2013.01); *G06F 2201/86* (2013.01); G06F 11/3409 (2013.01); *G06F 2201/875* (2013.01)
USPC ......... 706/11; 706/21; 714/E11.197; 718/104

(58) Field of Classification Search
USPC .......................................................... 706/11
See application file for complete search history.

(56) References Cited

U.S. PATENT DOCUMENTS

| 5,367,473 | A | 11/1994 | Chu et al. |
|---|---|---|---|
| 6,446,136 | B1 | 9/2002 | Pohlmann et al. |
| 7,185,367 | B2 | 2/2007 | Munson |
| 7,325,234 | B2 | 1/2008 | Smith |
| 7,395,252 | B2 | 7/2008 | Anderson et al. |
| 7,437,446 | B2 * | 10/2008 | Bailey et al. .................. 709/223 |
| 7,512,570 | B2 | 3/2009 | Chang et al. |
| 2003/0033403 | A1 | 2/2003 | Rhodes |

OTHER PUBLICATIONS

Ivory, MY, et al., "The State of the Art in Automating Usability Evaluation of User Interfaces", ACM Computing Surveys, Dec. 2001, vol. 33, No. 4, pp. 470-516.
Ramsay, Neil et al., "Annotating UI Architecture with Actual Use", 9th Australasian User Conference, Jan. 2008, vol. 76, pp. 75-78.
Hilbert, DM. et al., "Extracting Usabiliy Information from User Interface Events", AMC Computing Surveys, vol. 32, No. 4, Dec. 2000, pp. 384-421.

* cited by examiner

*Primary Examiner* — Jeffrey A Gaffin
*Assistant Examiner* — Nathan Brown, Jr.
(74) *Attorney, Agent, or Firm* — Kunzler Law Group

(57) ABSTRACT

An apparatus, system, and method are disclosed for defining normal usage of a computing system resource. A method for defining normal usage of a computing system resource includes receiving a repeating schedule that represents system usage of one or more computing resources and receiving one or more demand events that will affect the system usage of the one or more computer resources. The method also automatically creates a predictive temporal profile that represents the system usage of the one or more computer resources from information comprising the repeating schedule and the one or more demand events. The predictive temporal profile is displayed for the user to review.

19 Claims, 12 Drawing Sheets

702

|       | Mon. | Tues. | Wed. | Thur. | Fri. | Sat. | Sun. |
|-------|------|-------|------|-------|------|------|------|

12:00
1:00
2:00     Night Time Max Demand Window
3:00                 1004
4:00
5:00
6:00
7:00
8:00
9:00
10:00
11:00                                    Weekend Max
12:00    Week Day Max Demand Window      Demand Window
1:00                 1002                    1006
2:00
3:00
4:00
5:00
6:00
7:00
8:00
9:00     Night Time Max Demand Window
10:00                1004
11:00

FIG. 10

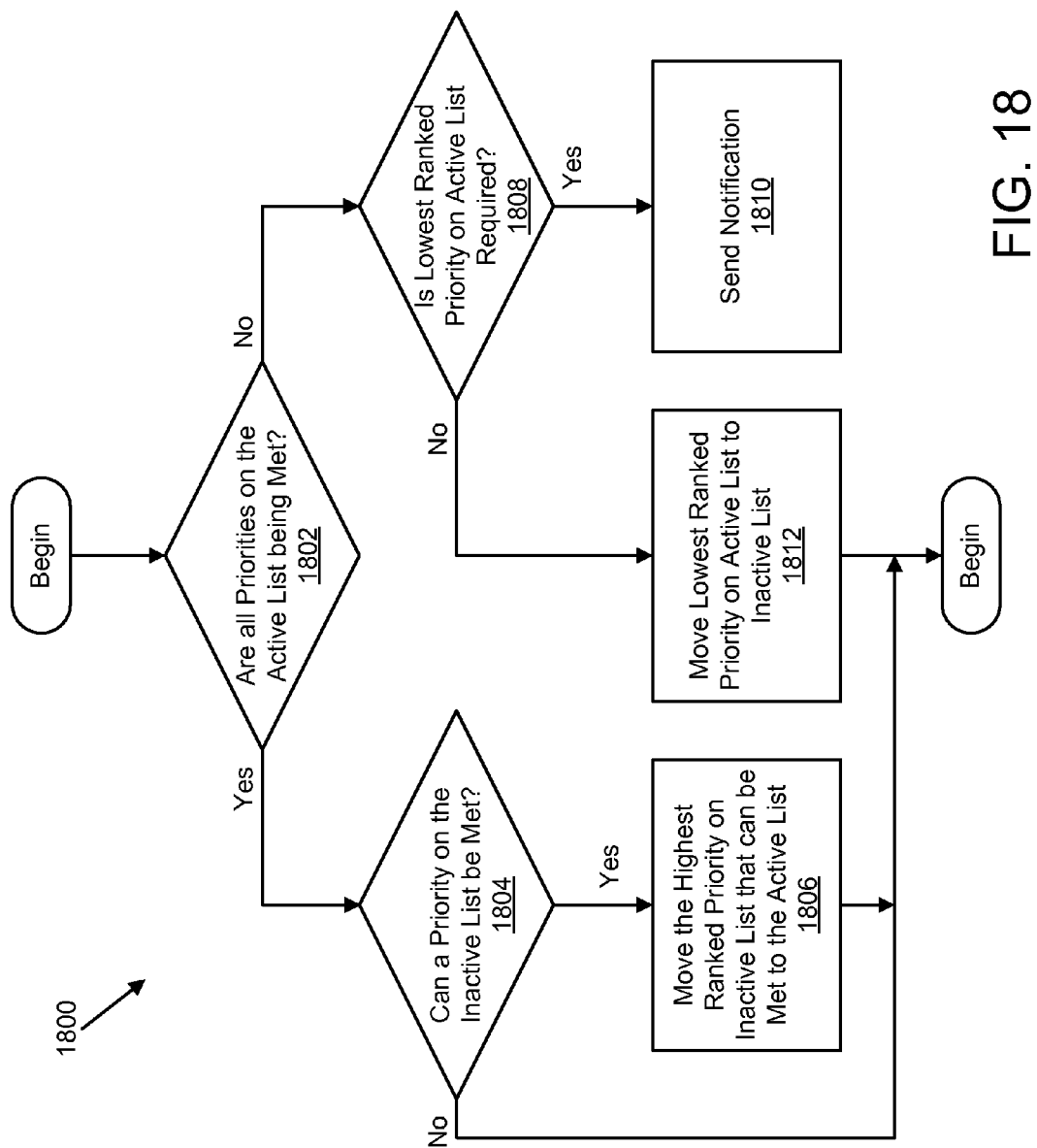

METHOD, SYSTEM, AND COMPUTER PROGRAM PRODUCT FOR AUTOMATICALLY APPLYING A PREDICTIVE TEMPORAL PROFILE TO COMPUTER RESOURCE MANAGEMENT DECISIONS

FIELD OF THE INVENTION

This invention relates to management of computing resources and more particularly relates to defining normal usage of the computing resources.

BACKGROUND

Description of the Related Art

Computing systems are often an integral part of or even the main purpose for business operations. As such, even minor problems with a computing system can result in inefficiencies, loss of business, or other costly consequences. To prevent such problems computing systems are often managed by administrators and others who monitor and maintain these systems. Because it can be expensive to employ enough humans to monitor and manage a computing system around the clock, monitoring software which runs on a computing system is often used.

Monitoring software can be used to trigger notifications or automated tasks without requiring constant human attention. This is typically done by creating software that monitors the usage of a CPU or other resource and triggering an action when it exceeds or drops below a single pre-defined value. This method has numerous drawbacks.

For example, an administrator may set up a notification to be sent when CPU usage exceeds 80%. However, the notification will be sent when the CPU usage is expected to be 80%, a false positive, and when it is expected to be 20%, when it may be helpful. This can result in the administrator being inundated with notifications which need to be sifted through to determine if a problem really exists. To avoid this problem, the administrator can set the threshold too high, in which case, he can miss an important issue that demands his attention. Such notifications may require more effort than they are worth.

In another example, an administrator may set up a task to be run when the CPU usage drops below 20% based on a running average calculated over the last hour. However, this lower threshold does not take the future into account. This drop may only be temporary. If the usage level increases soon after the drop the added task may overload the system and cause problems. This automated task may result in more problems and work for an administrator than if the automated task had not been set.

A third approach is to generalize to the future based on historical information by repeating one or more past intervals. For example, a system can take performance data from the previous week, and project resource demands for the next week. Other units of time might be repeated such as a month, quarter or year. One weakness of this approach is that it does not necessarily uncover the rule that defines repeating peaks. For example, if a payroll process runs on Friday the 29th, it is difficult for an algorithm to determine whether the process is designed to repeat on the last weekday of the month, the $29^{th}$, the last Friday, or some other rule. Similarly, simply using historical information can result in distortion of the prediction by including anomalies that the monitoring system cannot distinguish from expected behavior, such as a denial of service attack.

BRIEF SUMMARY

From the foregoing discussion, it should be apparent that a need exists for an apparatus, system, and method that enable automation of a computing system according to the expectations of a human administrator. Beneficially, such an apparatus, system, and method would easily define the expected normal usage of the system so that that the system can make more intelligent management decisions.

The present invention has been developed in response to the present state of the art, and in particular, in response to the problems and needs in the art that have not yet been fully solved by currently available automation systems. Accordingly, the present invention has been developed to provide an apparatus, system, and method for defining normal usage of system resources that overcome many or all of the above-discussed shortcomings in the art.

A method of the present invention is presented for defining normal usage of a computing system resource. In one embodiment, the method includes receiving a repeating schedule representing system usage of one or more resources of a computing system. The method also includes receiving one or one or more demand events that will affect the system usage of the one or more computer resources. The method also includes automatically creating a predictive temporal profile that represents the system usage of the one or more computer resources, the predictive temporal profile being created from information comprising the repeating schedule and the one or more demand events. The method further includes displaying the predictive temporal profile on a display for a user to review.

In one embodiment, reviewing the predictive temporal profile comprises one or more of viewing a graphical representation of the predictive temporal profile, adjusting the varying limits of the predictive temporal profile, and confirming that the predictive temporal profile may be used as a definition of normal usage of the one or more computing system resources. In another embodiment, the repeating schedule and the one or more demand events are displayed on the display for confirmation by a user.

In one embodiment, the repeating schedule includes repeating schedule resource usage data. In another embodiment, at least one of the demand events includes demand event resource usage data. In one embodiment, the repeating schedule resource usage data and the demand event resource usage data may include one or more of actual resource usage data, graphical data drawn by a user, and numerical data created by a user.

In one embodiment, a user interface is displayed on the display. In one embodiment, the user interface allows a user to submit, view, and modify a repeating schedule. In another embodiment, the user interface allows a user to submit, view, and modify a demand event. In another embodiment, the user interface allows a user to enable notifications. In another embodiment, the user interface allows a user to enable updates of the predictive temporal profile. In yet another embodiment, the user interface allows a user to enable automation of meeting priorities.

In a further embodiment, the predictive temporal profile includes varying limits that define a range of expected usage for the one or more system resources. In one embodiment, the varying limits may include resource usage data and an expected variation value. In another embodiment, the varying limits may include two or more demand windows. In one embodiment, the demand windows include one or more of an upper limit and a lower limit.

The method may include sending a notification when actual system resource usage does not follow the predictive temporal profile, the notification retrievable by a user. In one embodiment, the predictive temporal profile includes varying limits that define a range of expected usage for the one or more system resources. In one embodiment, not following the predictive temporal profile includes not falling within the varying limits.

The method may also include updating the predictive temporal profile based on actual system resource usage data. The method may also include marking one or more portions of the actual system resource usage data as an abnormality according to user input, wherein the resource usage data marked as an abnormality is not used to update the predictive temporal profile.

The method may also include automatically applying the predictive temporal profile to resource management decisions for the computing system. In one embodiment, automatically applying the predictive temporal profile to resource management decisions comprises causing a computing system to meet one or more priorities based on a priority rank and the predictive temporal profile.

A system of the present invention is presented for defining normal usage of computing system resources. In one embodiment, the system includes one or more computing system resources, a display, and a resource usage apparatus that includes modules that implement the method substantially as set forth in the above method. In one embodiment, the one or more demand events represent one or more of a sale, a marketing event, scheduled maintenance, a scheduled update, a scheduled upgrade, a holiday, and a scheduled task. In one embodiment, the one or more computing system resources comprises one or more of a processor, a network connection, random access memory, and a hard drive or other storage device.

A computer program product of the present invention is presented for defining normal usage of computing system resources. The computer program product includes executable code to perform operations that implement the method substantially as set forth above.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which:

FIG. 10 is an alternate representation of the maximum demand windows of FIG. 7 in accordance with the present invention;

FIG. 18 is a schematic flow chart diagram illustrating one embodiment of a method for automating priority management in accordance with the present invention;

DETAILED DESCRIPTION

Figure 1:
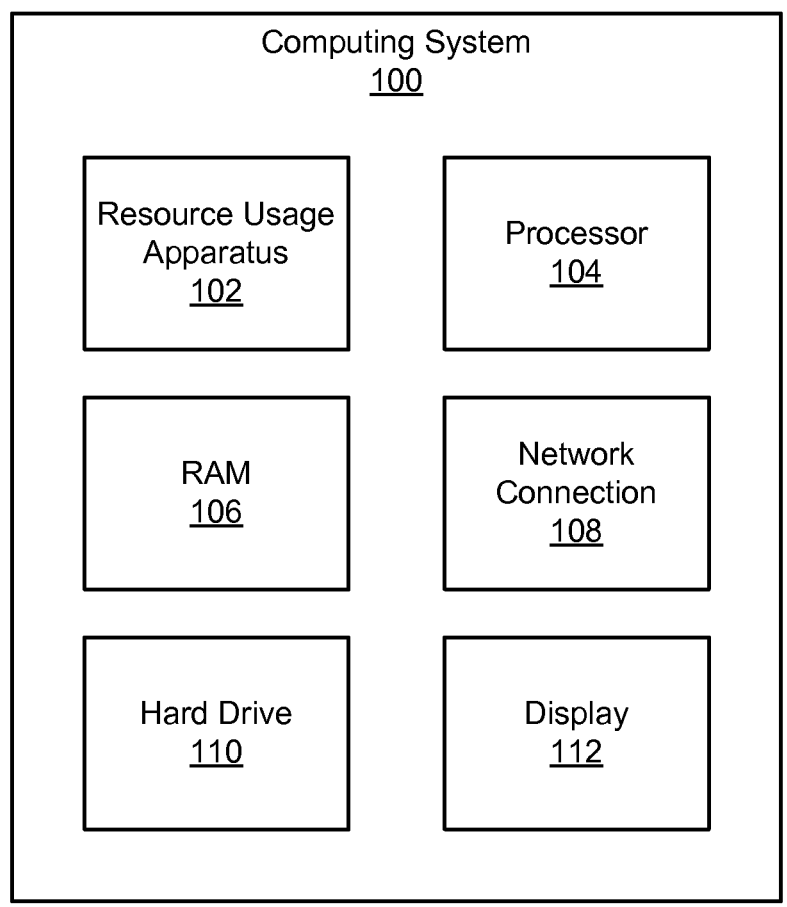
FIG. 1 is a schematic block diagram illustrating one embodiment of a computing system for defining normal usage of system resources, in accordance with the present invention.

The present invention receives a repeating schedule and one or more demand events that represent usage of one or more resources on a computing system. A predictive temporal profile is created based on the repeating schedule and the one or more demand events. The predictive temporal profile comprises varying values that represent the expected usage of the computing system resources. The predictive temporal profile may then be used by the computing system as a definition of what is normal usage of system resources. For example, a user, such as a system administrator, may use the present invention to create a predictive temporal profile that reflects his or her expectation of the normal usage of the computing system. In one embodiment, the computing system will then be able to provide notifications when the system is acting abnormally by comparing actual resource usage to the predictive temporal profile. In another embodiment, the predictive temporal profile may be used by a computing system to make intelligent task scheduling decisions because it knows what the future usage is expected to be.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable media.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Reference to a computer readable medium may take any form capable of storing machine-readable instructions on a digital processing apparatus. A computer readable medium may be embodied by a transmission line, a compact disk, digital-video disk, a magnetic tape, a Bernoulli drive, a magnetic disk, a punch card, flash memory, integrated circuits, or other digital processing apparatus memory device.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

FIG. 1 depicts one embodiment of a computing system 100 for defining normal usage of one or more computing system resources. The computing system 100 may include a computer, a mainframe, a cloud computing system, or the like. The computing system 100 includes a resource usage apparatus 102, one or more system resources 104-110, and a display 112. As used herein, the term system resource refers broadly to hardware or logical resources used by code or software executing on a computing system. The processor resource 104, random access memory (RAM) resource 106, the network connection resource 108, and the hard drive resource 110 represent exemplary system resources whose normal usage may be of interest to a user such as a system administrator.

The processor resource 104 may include one or more processors including physical and/or virtual processors. The usage level of the processor resource 104 may be of interest because it may indicate the size of the processing workload that is being required of the computing system 100. The RAM resource 106 may include one or more physical memory chips or virtual memory locations. The usage level of the RAM resource 106 may indicate the memory requirements of the current computing system 100 workload.

The network connection resource 108 may comprise one or more network connections which allow the computing system 100 to communicate with other computing systems or electronic devices. The usage level of the network connection resource 108 may include information about the amount of data that is being sent or received through the network connection resource 108 and may indicate the communication workload of the computing system 100. The hard drive resource 110 may include one or more physical and/or virtual static memory devices. The usage level of the hard drive resource 110 may include the amount of data being stored and/or the amount of data being transferred to or from the hard drive resource 101 and may indicate the demand on static memory of the computing system 100.

The resource usage apparatus 102 defines normal usage of one or more of the system resources 104-110 by creating a predictive temporal profile. The predictive temporal profile represents what is expected to be the normal usage of the one or more system resources 104-110 in the future. In one embodiment, the predictive temporal profile includes varying limits that define a range of expected usage of the one or more system resources 104-110. The varying limits may include upper and/or lower limits that vary over time. The computing system 100 may then use the predictive temporal profile for resource management decisions. In the depicted embodiment, the resource usage apparatus 102 is shown as a part of the computing system 100. However, in other embodiments, the resource usage apparatus 102 may be a separate apparatus. In another embodiment, the resource usage apparatus 102 is used to create a predictive temporal profile for system resources on a system separate from the computing system 100.

The display 112 may be used to provide a visual interface for a user to observe, control or modify the operations of the resource usage apparatus 102 and/or the computing system 100. In one embodiment, a visual interface is shown on the display 112 where a user can observe, modify, and/or input data used to create the predictive temporal profile. In one embodiment, the display 112 is a computer monitor or other display. In one embodiment, the display 112 is used to show a graphical user interface (GUI) or other interface. The display 112 may be used to show graphs or other data as well as allow the user to view notifications, modify software options, or the like.

Figure 2A:
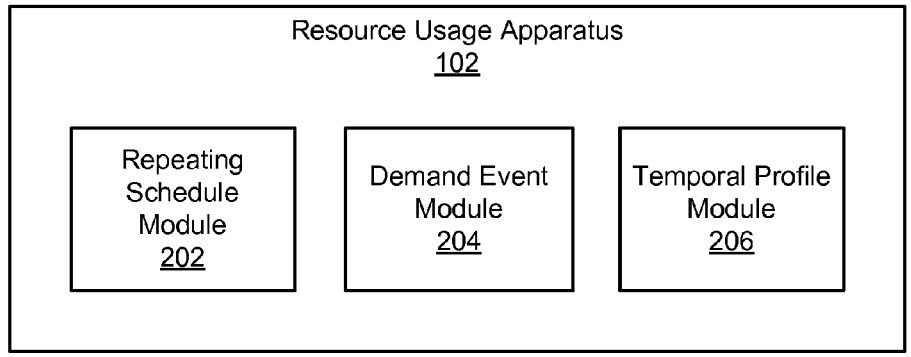
FIG. 2A is a schematic block diagram illustrating one embodiment of a resource usage apparatus in accordance with the present invention.
Figure 2B:
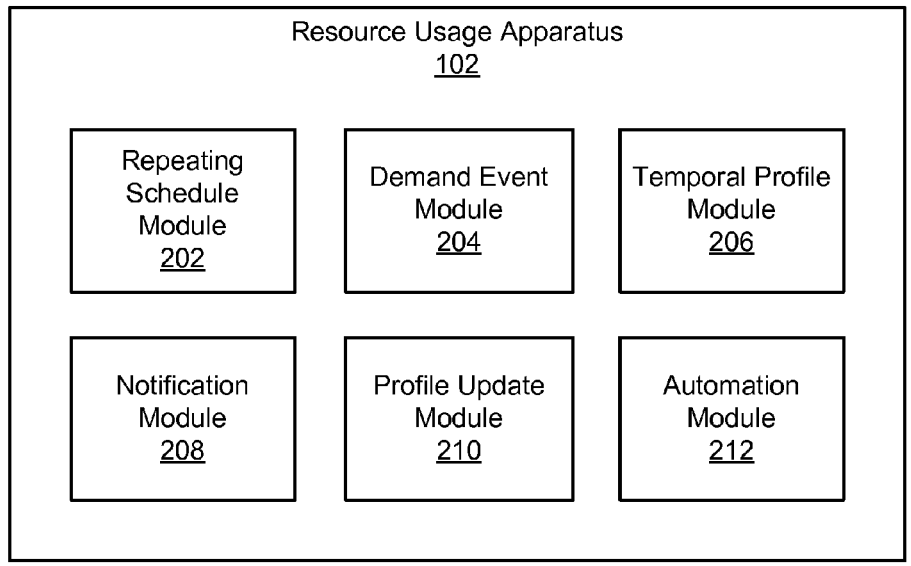
FIG. 2B is a schematic block diagram illustrating another embodiment of a resource usage apparatus in accordance with the present invention.

FIGS. 2A and 2B depict exemplary embodiments of the resource usage apparatus 102. FIG. 2A depicts a resource usage apparatus 102 having a repeating schedule module 202, a demand event module 204, and a temporal profile module 206. The resource usage apparatus 102 and its modules 202-206 facilitate defining normal usage of one or more resources for a computing system 100.

The repeating schedule module 202 receives a repeating schedule representing system usage of one or more computing system resources, such as system resources 104-110 of FIG. 1. The repeating schedule received by the repeating schedule module 202 may take a variety of forms. The repeating schedule may include a series of numbers representing usage of one or more system resources over time. In another embodiment, the repeating schedule alternatively or additionally includes a graphical representation of the usage of system resources.

In one embodiment, the repeating schedule module 202 may receive a series of numbers representing system resource usage from a user and create a graphical representation of the series of numbers. In another embodiment, the repeating schedule module 202 may receive a graphical representation and create a series of numbers representing system usage over time. In one embodiment, a graphical representation is drawn by the user using a touchpad, mouse, or other input device. After receiving the repeating schedule, the repeating schedule module 202 may display the schedule to the user. The user may then be able to review the repeating schedule, modify it, and/or resubmit it to the resource usage apparatus. For example, the user may modify the repeating schedule by adjusting data values or redrawing a portion of a graph that represents the repeating schedule.

In one embodiment, the repeating schedule module 202 receives actual system resource usage data, such as data about the actual usage of the processor resource 104 gathered by the computing system 100, the resource usage apparatus 102, or a user such as a system administrator. In another embodiment, the repeating schedule module 202 receives actual resource usage data modified by a user. For example, the user may take actual resource usage data and modify it to alter or remove data that the user believes will not repeat regularly in the future or data that the user would like to be notified of if repeated. In another embodiment, the repeating schedule module 202 receives actual resource usage data and then provides an interface, such as a graphical user interface (GUI), so that the user can modify the repeating schedule.

In other embodiments, the repeating schedule includes a number of demand windows that indicate a start time, stop time, and an upper and/or lower resource usage limit. A user may enter information for one or more demand windows and the repeating schedule module 202 may generate a graphical representation of the demand windows in the repeating schedule. This graphical representation may then be displayed on the display 112 for the user. In another embodiment, the repeating schedule module 202 may receive a repeating schedule and then create demand windows around the schedule. In one embodiment, a user can modify, approve, and/or label the demand windows after the demand windows are created. The demand windows may be used to define the repeating schedule in a way that is more meaningful to administrators. For example, an administrator can think of system usage in terms of night time demand windows, day time demand windows, weekend demand windows, or demand windows based on scheduled tasks. The repeating schedule module 202 may provide an interface, such as a GUI, that allows the user to draw demand windows around actual usage data. For example, the GUI may include a display of the repeating schedule on a display 112 such as a computer screen where the user can draw the demand windows.

The duration of the repeating schedule received by the repeating schedule module 202 may vary considerably and may be partly dependent on the computing system 100 in which the resource usage apparatus 102 is used or the target computing system for the predictive temporal profile. For example, if the target computing system 100 includes an email server for a corporate office there may be a pattern that generally repeats on a weekly basis, with peak usage during the day when most emails are sent and minimum usage at night and on the weekend. Thus, a repeating schedule with a week-long duration may be desirable. In other situations or environments, daily, monthly, or other time durations without limitation may be desirable.

The demand event module 204 receives one or more demand events that will affect the usage of the one or more system resources. In one embodiment, demand events are entered into the demand event module 204 in a manner similar to how events or schedules are entered into a personal information management (PIM) software, such as Microsoft Outlook or Google Calendar. For example, a user may choose a start time, duration, and a name for the demand event. In one embodiment, a calendar format is displayed on the display 112 for the user to schedule demand events. The demand event may be scheduled to recur at an additional time or may be scheduled to occur only once.

The user may also provide demand event resource usage data for the change in resource usage during that demand event. For example, if an extra process will be running during that demand event, the user may provide data indicating the increase of resource usage due to that extra process. The variations in relation to the repeating schedule as discussed above also apply to the demand event resource usage data. In one embodiment, the demand event resource usage data comprises a graphical and/or a numerical representation of resource usage during the demand event which the user can view or modify on the display 112.

The demand events received by the demand event module 204 may vary considerably. In one embodiment, the demand event may correspond to an event external to the computing system 100, such as a holiday, a company promotion, a newsworthy event, or the like. In another embodiment, the demand event corresponds to events internal to the system, such as an anti-virus scan or software update being performed by the computing system 100. In one embodiment, the demand events received by the demand event module 204 also include instructions to begin and/or end the execution of code.

The temporal profile module 206 creates a predictive temporal profile that represents the predicted system resource usage for the computing system 100. In one embodiment, the predictive temporal profile includes varying limits which define a range of normal resource usage. The temporal profile module 206 creates the predictive temporal profile from data including the repeating schedule received by the repeating schedule module 202 and the one or more demand events received by the demand event module 204. In one embodiment, the temporal profile module 206 creates a predictive temporal profile by repeating the repeating schedule and adding on the demand events at their scheduled times. The addition of the demand events to the repeating schedule may include a simple addition and time shift operation or may include different weightings of the repeating schedule and demand events. The resulting predictive temporal profile may be shown on the display 112 to a user. The user may be able to confirm or reject the predictive temporal profile.

In one embodiment, the computing system 100 includes a mainframe computer with multiple processors, the processors having different performance characteristics. The temporal profile module 206 may weight each of the repeating schedule and one or more demand events differently depending on which processor will be affected by the schedule or demand event. After the repeating schedule and the one or more demand events have been properly weighted the temporal profile module 206 may then add them up to create the predictive temporal profile.

The resource usage apparatus 102 may be seen as combining the processing power of a computing system 100 with the understanding of a human user. Computing systems 100 can provide an easy and powerful interface, organize large amounts of data, and automate complicated tasks. On the other hand, human users can often understand the cause of peaks and valleys in system resource usage more easily than a computing system. By receiving the repeating schedule and demand events from a user and then automating the creation of a temporal profile, the advantages of both are combined when using the resource usage apparatus 102.

The utilization of repeating schedules is useful because a repeating schedule can often approximate system resources, especially within larger systems. By providing a schedule that repeats, the usage of system resources can be easily predicted into the future with relatively little data or computational effort. However, there are often variations in schedule that are clearly understood by users such as system administrators but hard to capture in a repeating schedule. For example, certain tasks may be scheduled to occur on the second Friday of each month. Such a task may occur anywhere from eight to fourteen days into the month and the time between each repetition may range from two to five weeks. This can make it very difficult for a computer algorithm to determine the rule behind the reoccurrence of the demand event. On the other hand, such a scheduled task is easily understood in the context of an electronic calendar. Thus, the repeating schedule module 202 and demand event module 204 provide simple ways to enter data relating to very complex resource usage data. Furthermore, even though a computer may be able to determine the rule behind the reoccurrence, it could not do this until the demand event has occurred one or more times. Thus, the computing system 100 may experience problems during the one or more times before the computer algorithm figures out the reoccurrence rule.

Furthermore, by creating the predictive temporal profile from the repeating schedule and the demand events, the temporal profile module 206 very accurately defines normal system resource usage in the future. This is because an administrator or other user can provide all the details he or she knows about, in the form of a repeating schedule and one or more demand events, and the resource usage apparatus 102 combines them into a predictive temporal profile understood by the resource usage apparatus 102 or a computing system 100. This provides an administrator or the computing system 100 with considerable power for automation of system operation and resource management decisions.

FIG. 2B depicts a resource usage apparatus having a repeating schedule module 202, a demand event module 204, and a temporal profile module 206, similar to the resource usage apparatus 102 of FIG. 2A. However, the resource usage apparatus 102 also includes additional modules including a notification module 208, a profile update module 210, and an automation module 212. The additional modules 208-212 provide additional capabilities to the resource usage apparatus 102. Various embodiments of the resource usage apparatus 102 may include one or more of the additional modules 208-212.

The notification module 208 facilitates automation of notifications. The notification module 208 compares actual system resource usage to the predictive temporal profile created by the temporal profile module 206. When the actual system resource usage varies too greatly from the predictive temporal profile, the notification module 208 sends a notification. For example, the notification may be sent to a user, a system administrator, or even a log file. Because the predictive temporal profile represents what is expected to happen with system resources, notifications are only sent when something unexpected occurs. This can be very useful to a system administrator who wished to know when anything abnormal is occurring. Because the predictive temporal profile provides such an accurate definition of what is normal, the administrator can trust that the system will detect anything abnormal.

The profile update module 210 facilitates updating the predictive temporal profile. The profile update module 210 may update the predictive temporal profile with actual resource usage data. The profile update module 210 may log actual resource usage data as the computing system 100 operates. Alternatively, the profile update module 210 may receive the actual resource data from a user, the computing system 100, or a separate apparatus that has logged the actual resource usage data. The profile update module 210 may update the predictive temporal profile by comparing the predictive temporal profile with the actual resource usage data and modifying the predictive temporal profile to more closely resemble the actual resource usage data. In one embodiment, the predictive temporal profile increases or decreases portions of the predictive temporal profile to accommodate the actual resource usage data.

Automating the updates of the predictive temporal profile can allow the resource usage apparatus 102 to refine, improve, and adapt to changes in system resource usage over time without requiring a lot of effort on the part of a user.

The automation module 212 automates one or more operations of the computing system 100 according to the predictive temporal profile and priorities set by a user. The automation module 212 compares the predictive temporal profile to the priorities set by the user and determines which priorities can and cannot be met. According to one embodiment, the automation module 212 receives one or more priorities provided by a user ranked in order of most important to least important. The automation module 212 may place priorities that it determines can be met on an active list and priorities that cannot be met on an inactive list. The automation module 212 may then require the computing system 100 to meet the priorities on the active list.

Exemplary operation of the resource usage apparatus 102, modules 204-212, and computing system 100 will be discussed in relation to the remaining figures.

Figure 3:
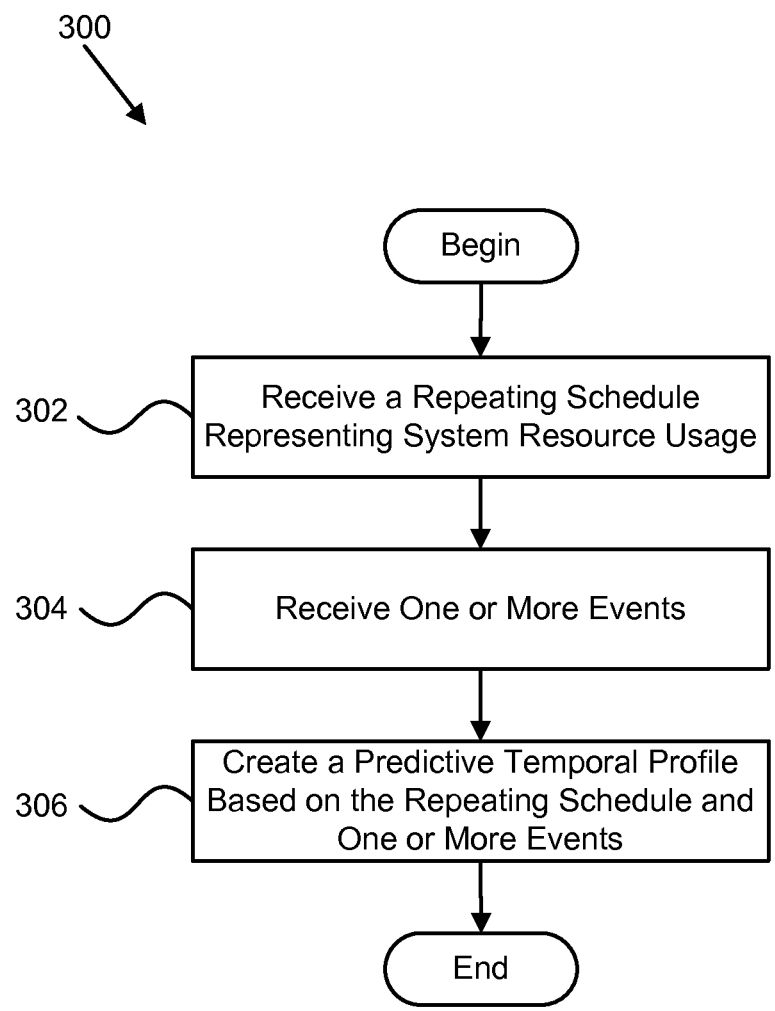
FIG. 3 is a schematic flow chart diagram illustrating one embodiment of a method for defining normal usage of system resources in accordance with the present invention.

FIG. 3 is a flow chart depicting a method 300 of defining normal usage of computing system resources performed by a resource usage apparatus 102. The method 300 begins and the repeating schedule module 202 receives 302 a repeating schedule representing system resource usage. In one embodiment, the repeating schedule module 202 receives 302 more than one repeating schedule. The repeating schedule may include repeating schedule usage data, repeating schedule start time information, and a repeating schedule duration.

The repeating schedule usage data in the repeating schedule may include variable types of data that, if repeated, approximate the expected usage of one or more system resources in the future. In one embodiment, the repeating schedule usage data may include a series of numbers that represent resource usage over time. In another embodiment, the repeating schedule usage data may include a graphical representation of resource usage over time.

In another embodiment, the repeating schedule usage data may include a one or more demand windows, each having a demand window start time, a demand window duration, and a demand window limit value. The demand window limit can either be an upper limit that exceeds or matches the expected maximum value of the resource usage during the demand window or a lower limit that is exceeded or matched by the minimum value of resource usage during the demand window, or both. In yet another embodiment, the repeating schedule usage data may include one or more of a series of numbers, a graphical representation, and a demand window. The repeating schedule usage data has a duration which corresponds with the repeating duration of the repeating schedule. The duration of the repeating schedule can vary considerably as mentioned above.

The repeating schedule start time information indicates at what time or times the repeating schedule may start. For example, a repeating schedule that has a weekly duration may need to be started on the correct day of the week and the correct time of day in order to correctly approximate resource usage.

The method 300 also includes the demand event module 204 receiving 304 one or more demand events that will affect the usage of system resources. According to one embodiment, the one or more demand events each include demand event start time information, demand event resource usage data, demand event recurrence data, and a demand event name. The demand event start time information, similar to the repeating schedule start time information discussed above, indicates when the demand event will begin. For example, the demand event start time information may include a date and time for the demand event to begin. The demand event resource usage data, similar to the repeating schedule usage data, may include one or more of a series of numbers, a graphical representation, and a demand window. The demand event resource usage data also has a duration which can vary without limitation.

The demand event may further include demand event recurrence data for demand events that will occur on more than one occasion. For example, a demand event may recur every fourth Friday of a month. The demand event recurrence data enables a user to easily define recurring demand events that are difficult to capture in a repeating schedule with a fixed duration and without repeatedly entering the same or similar demand event information over and over.

The method 300 further includes the temporal profile module 206 creating 306 a predictive temporal profile based on the repeating schedule and the one or more demand events. The predictive temporal profile represents what is expected to be the normal usage of one or more system resources in the future. The predictive temporal profile includes profile resource usage data and profile start time information. The profile resource usage data may take a variety of forms including those mentioned above in relation to the repeating schedule resource usage data and the demand event resource usage data. Various exemplary embodiments include one or more of a series of numbers, a graphical representation, and a demand window. The profile start time information indicates to what point or points in time the beginning of the profile resource usage data may correspond.

The predictive temporal profile is created based at least in part on a repeating schedule and one or more demand events. In one embodiment, the predictive temporal profile is created by repeating the repeating schedule and adding the one or more demand events at the demand events' scheduled times. The predictive temporal profile and the one or more demand events may each be weighted differently. In one embodiment, the predictive temporal profile is created from more than one repeating schedule and one or more demand events.

Because the repeating schedule is repeatable, the predictive temporal profile may vary considerably in length. For example, if a repeating schedule has a duration of one week, the predictive temporal profile may include four repetitions of the repeating schedule and have a duration of one month. The predictive temporal profile may also include a fractional number of repetitions of the repeating schedule such as three and a half repetitions to form three and a half weeks.

In one embodiment, the temporal profile module 206 may create 306 a predictive temporal profile every month or every few months. For example, the temporal profile module 206 may create 306 a predictive temporal profile that has a duration of four weeks once every four weeks. This may be desirable if demand events further than four weeks into the future are not known or understood. This may save the temporal profile module 206 from creating multiple temporal profiles that cover the same period of time.

Implementation of the method 300 of defining normal usage will now be illustrated in relation to FIGS. 4-11.

Figure 4:
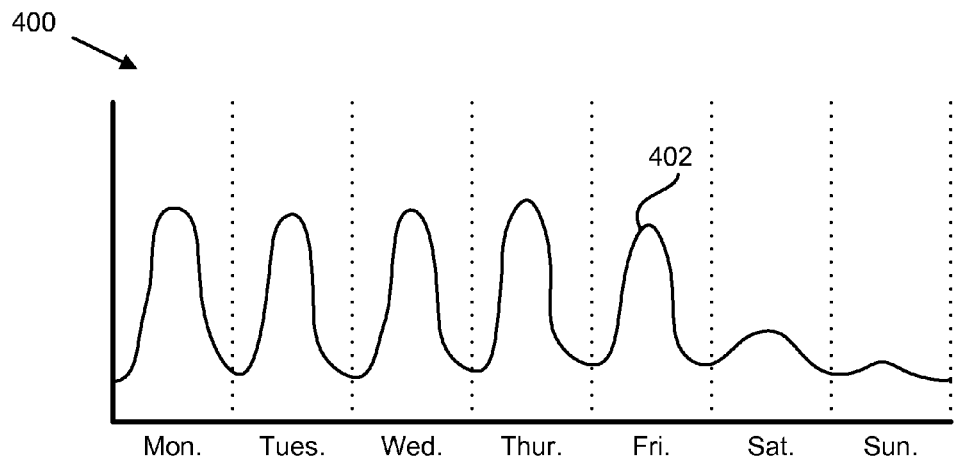
FIG. 4 is a graphical representation illustrating a repeating schedule in accordance with the present invention.
Figure 5:
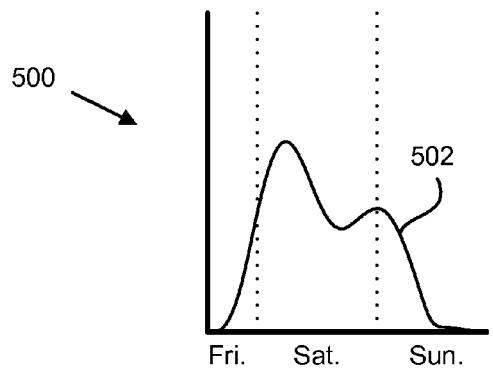
FIG. 5 is a graphical representation illustrating a demand event that affects the usage of system resources in accordance with the present invention.
Figure 6:
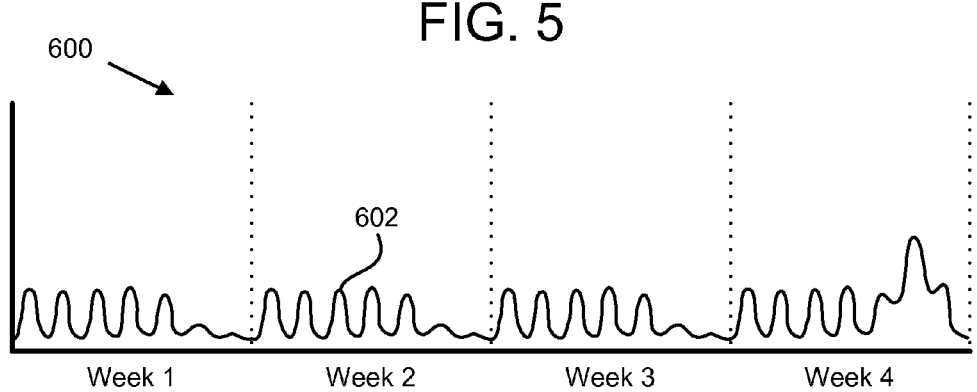
FIG. 6 is a graphical representation illustrating a predictive temporal profile in accordance with the present invention.

FIGS. 4-6 depict an implementation of method 300 according to one embodiment. FIG. 4 depicts an exemplary repeating schedule 400 with a duration of one week. The repeating schedule 400 is received 302 by the repeating schedule module 202. The depicted repeating schedule 400 includes repeating schedule resource usage data 402 displayed as a smooth curve which represents usage of the processor resource 104 on the computing system 100. The processor resource 104 experiences peak workloads during weekdays and minimum workloads on nights and weekends. As an example, this usage may reflect the computing system 100 operating as an email server.

The repeating schedule 400 and the schedule resource usage data 402 may vary considerably based on the specific computing system, what the computing system is used for, and what system resources are used to create the repeating schedule resource usage data 402. For example, static memory storage usage may not fluctuate like processor usage. On the other hand, the rate of reading and writing to static memory may vary similar to the repeating schedule resource usage data 402 as shown. As will be understood by one skilled in the art and in light of the present invention, variations of the resource usage data may still be displayed using similar graphs and/or demand windows.

The repeating schedule 400 may be received 302 by the repeating schedule module 202 in a variety of ways. For example, the repeating schedule module 202 may receive 302 the repeating schedule 400 from a system or program that logs usage of a resource. Alternatively or additionally, the user may upload a file, enter a series of numbers, or draw the smooth curve 402. A user, in one embodiment, may then edit the uploaded data by editing the data, or marking portions of the data as abnormal and to be ignored. In one embodiment, the repeating schedule module 202 provides an interface where a user can perform these actions. For example, the repeating schedule module 202 may provide a GUI that includes an area similar to FIG. 4 where a graph can be drawn or edited using an input device such as a mouse or a touch screen.

FIG. 5 depicts a demand event 500 that will affect usage of the processor resource 104 on the computing system 100. The demand event 500 is received 304 by the demand event module 204. As an example, the demand event 500 may represent a payroll process that is to be executed by the computing system 100 on every fourth Friday. The demand event includes a demand event start time (Friday afternoon) and a duration which results in the demand event ending Sunday evening. The demand event 500 also includes demand event resource usage data 502. In one embodiment, the demand event resource usage data 502 represents the change in usage due to the demand event. In another embodiment, the demand event resource usage data 502 replaces the repeating schedule usage data 402 during the demand event 500.

The demand event 500 may be received by the demand event module 204 in a manner similar to that discussed in relation to the repeating schedule 400 and the repeating schedule module 202. Alternatively or additionally, demand event 500 details may be entered by a user in a similar way that events are entered into PIM software such as Microsoft Outlook and Google Calendar.

FIG. 6 depicts an exemplary predictive temporal profile 600. The predictive temporal profile 600 is created 306 by the temporal profile module 206 based on the repeating schedule 400 and the demand event 500. In one embodiment, the temporal profile module 206 creates 306 a predictive temporal profile 600 by repeating the repeating schedule 400 four times and adding the demand event resource usage data 502 beginning on the fourth Friday in the afternoon, as indicated by the corresponding demand event 500. For example, the repeating schedule resource usage data 402 is repeated during Week 1, Week 2, and Week 3 to create the profile resource usage data 602 for those weeks. For Week 4 the repeating schedule resource usage data 402 and the demand event resource usage data 502 are added to create the profile resource usage data 602 for that week. If the repeating schedule 400 and the demand event 500 represent the expected resource usage during their proper time periods, the profile resource usage data 602 represents the expected processor resource 104 usage on the computing system 100 for four weeks.

According to one embodiment, the profile resource usage data 602 comprises data points that include the expected resource usage at a particular point in time. The data points may be separated from neighboring data points by a time interval. The time interval may vary according to the resolution desired by an administrator. Shorter time intervals may result in more data and a larger workload for a computing system. Longer time intervals may not provide enough data to be useful. In various embodiments, the time interval may vary from fractions of a second to minutes in length.

The predictive temporal profile 600 shown is four weeks long. The length of the predictive temporal profile 600 created by the temporal profile module 206 may vary considerably. Shorter predictive temporal profile 600 lengths may require less computing and/or memory but may require that the predictive temporal profile 600 be created 306 more frequently. Additionally, a user may not know demand events 500, how demand events will affect resource usage (502), or the repeating schedule 400 for time periods too far into the future. On the other hand, if the future schedule of processor usage is believed to be mostly understood, the predictive temporal profile 600 may be calculated for longer periods of time.

In one embodiment the predictive temporal profile 600 further includes an expected variation value (not shown). For example, a user may not expect the resource usage to follow the profile resource usage data 602 exactly, but to remain within an expected variation value, such as a 10% processor usage range. This may account for an expectation by a user that the processor resource 104 usage may be within 10% of profile resource usage data 602 at a given point in time. Thus, the profile resource usage data 602 plus or minus the expected variation value defines varying limits within which the actual resource usage is expected to fall.

Figure 7:
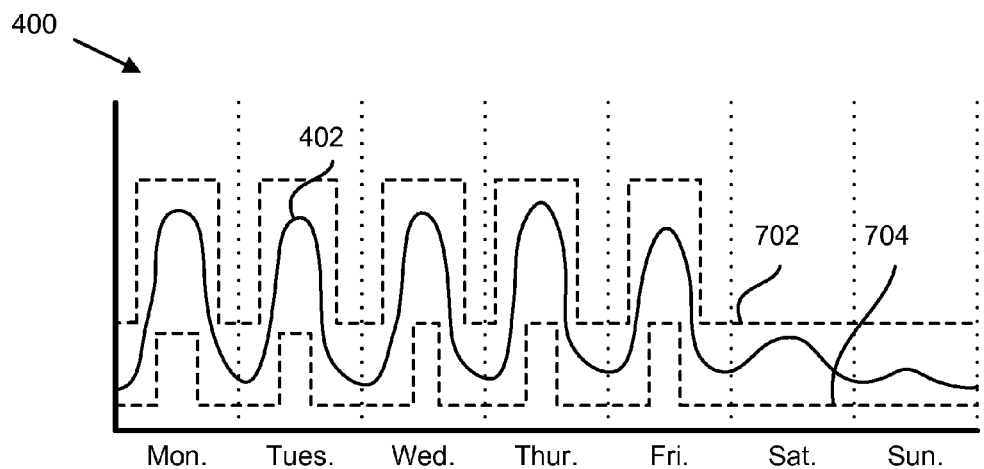
FIG. 7 is a graphical representation illustrating a repeating schedule that includes demand windows in accordance with the present invention.
Figure 8:
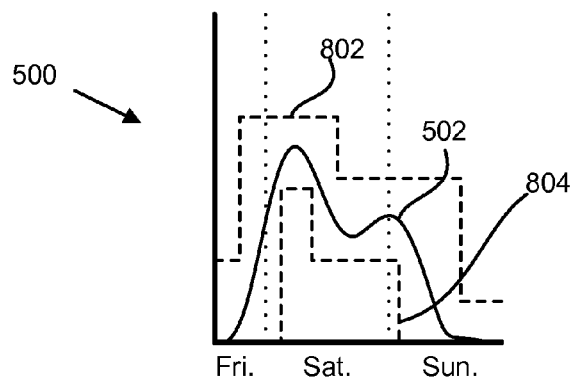
FIG. 8 is a graphical representation illustrating a demand event that affects the usage of system resources and includes demand windows in accordance with the present invention.
Figure 9:
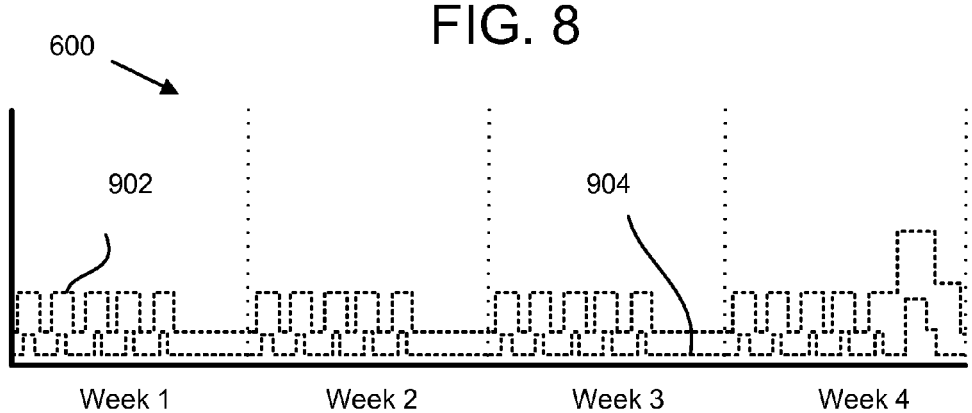
FIG. 9 is a graphical representation illustrating a predictive temporal profile that includes demand windows in accordance with the present invention.

FIGS. 7-9 depict an implementation of method 300 according to another exemplary embodiment. FIG. 7 depicts an exemplary repeating schedule 400 with a duration of one week and having the same repeating schedule resource usage data 402 as the repeating schedule 400 of FIG. 4. However, the repeating schedule 400 further includes repeating maximum demand windows 702 and repeating minimum demand windows 704.

In one embodiment, the repeating schedule module 202 receives 302 the repeating schedule 400 of FIG. 4 and automatically calculates repeating maximum demand windows 702 above the repeating schedule resource usage data 402 and repeating minimum demand windows 704 below the repeating schedule resource usage data 402. This may be done, for example by minimizing the area between the demand windows 702, 704 and the repeating schedule resource usage data 402 while maintaining a minimum distance. For example, the upper limits of the repeating maximum demand windows 702 may be a minimum distance above any peaks within a corresponding demand window and the start times of the maximum demand windows 702 may be a minimum time period away from any repeating resource usage data 402 of the same value. In one embodiment, a user can modify, approve, and/or label the repeating demand windows 702, 704 after they have been calculated.

In another embodiment, a user obtains data represented by the smooth curve 402 and defines demand windows 702, 704 and submits the repeating schedule 400 to the repeating schedule module 202. In another embodiment, the repeating schedule module 202 may receive the repeating schedule resource usage data 402 and provide a GUI for a user to draw demand windows 702, 704.

FIG. 8 depicts a demand event 500 having the same demand event resource usage data 502 as demand event 500 of FIG. 5. However, the demand event 500 further includes demand event maximum demand windows 802 and demand event minimum demand windows 804. In one embodiment, the demand event module 204 receives 304 the demand event 500 of FIG. 5 and automatically calculates maximum demand windows 802 above the demand event resource usage data 502 and minimum demand windows 804 below the demand event resource usage data 502. In one embodiment, a user can modify or approve the repeating demand windows 802, 804 after they have been calculated. In another embodiment, a user obtains demand event resource usage data 502 and defines demand windows 802, 804 and submits the demand event 500 to the demand event module 204. The demand event module 204 may provide an interface for entering of the demand event 500 in a manner similar to that discussed in relation to the repeating schedule 400 of FIG. 7.

FIG. 9 depicts an exemplary predictive temporal profile 600. The predictive temporal profile 600 is created 306 by the temporal profile module 206 based on the repeating schedule 400 and the demand event 500. The predictive temporal profile 600 includes maximum demand windows 902 and minimum demand windows 904. In one embodiment, the temporal profile module 206 creates 306 the predictive temporal profile 600 by repeating the repeating schedule 400 demand windows 702, 704 to create the demand windows 902, 904 during each of Week 1, Week 2, and Week 3. During Week 4, the demand event demand windows 802, 804 are added to the repeating schedule demand windows 702, 704, respectively, on Friday to create the demand windows 902, 904 during that week. In another embodiment, the predictive temporal profile 600 is created 306 by combining the repeating schedule resource usage data 402 and demand event resource usage data 502 in the manner described in relation to FIG. 6 and then creating demand windows 902, 904 around the profile resource usage data 602. In one embodiment, a user modifies, approves, and/or labels the demand windows 902, 904 after they have been automatically created by the temporal profile module 206.

FIG. 10 is an alternate representation for the repeating maximum demand windows 702 of the weekly repeating schedule 400 of FIG. 7. The week day maximum demand window 1002 corresponds to the peak values shown on the repeating maximum demand windows 702. The night time maximum demand window 1004 corresponds to the low values shown on the repeating maximum demand windows 702 and the weekend maximum demand window 1006 corresponds to the weekend value shown on the repeating maximum demand windows 702. According to one embodiment, each maximum demand window 1002-1006 includes an upper limit value which represents the highest value the processor resource 104 usage is expected to reach during the respective demand window The representation of the repeating maximum demand windows 702 of FIG. 10 also provides an exemplary method of entering demand windows. In one embodiment, the repeating schedule module 202 provides a GUI that includes a section similar to FIG. 10 where demand windows can be entered and/or modified.

Figure 11:
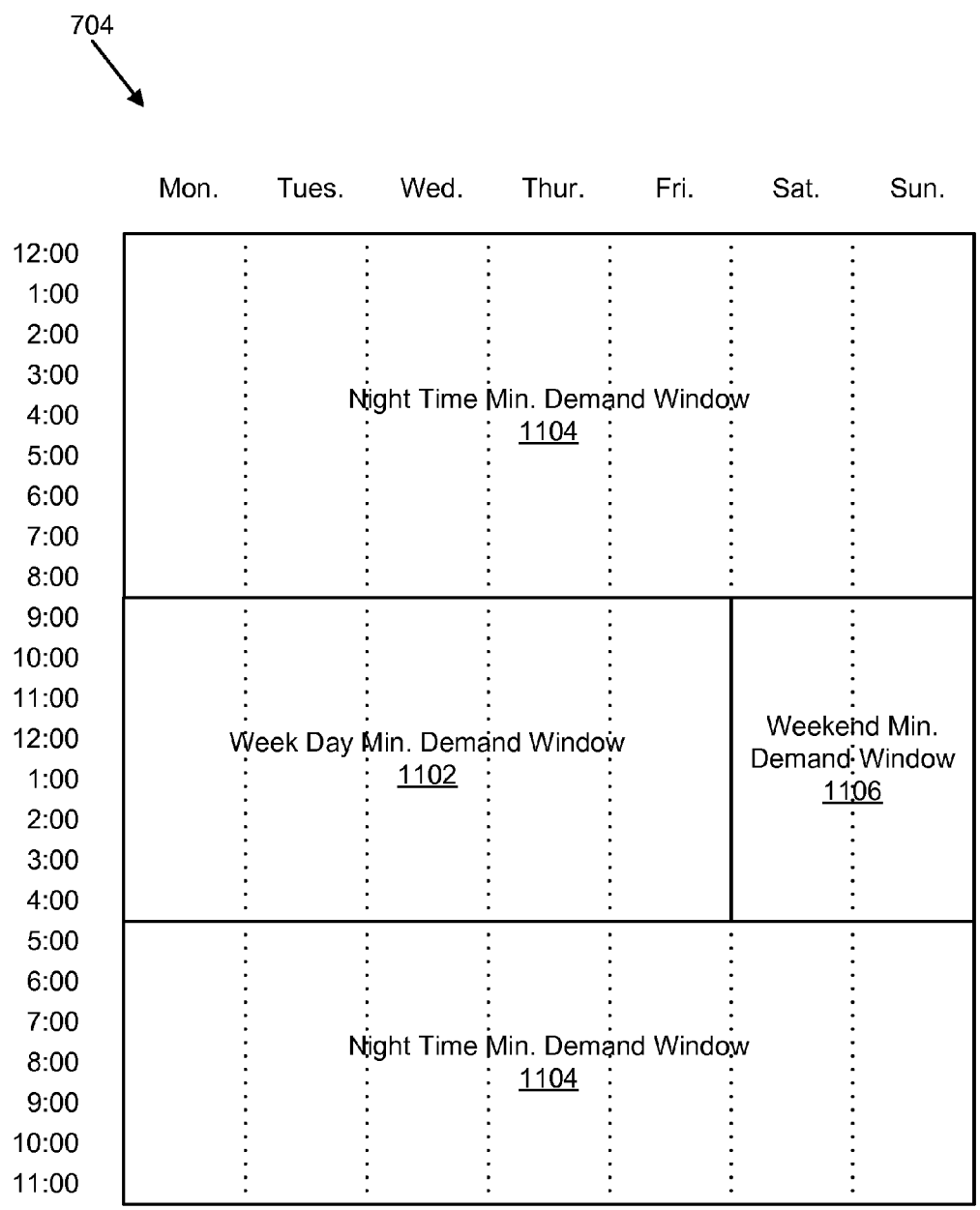
FIG. 11 is an alternate representation of the minimum demand windows of FIG. 7 in accordance with the present invention.

FIG. 11 is an alternate representation for the minimum demand windows 704 for the weekly repeating schedule 400 of FIG. 7. The week day minimum demand window 1102 corresponds to the peak values shown on the repeating minimum demand windows 704. The night time minimum demand window 1104 corresponds to the low values shown on the repeating minimum demand windows 704 and the weekend minimum demand window 1106 corresponds to the weekend value shown on the repeating minimum demand window 704. According to one embodiment, each minimum demand window 1102-1106 includes a lower limit value which represents the lowest value the processor resource 104 usage is expected to reach during that demand window.

The maximum demand windows 1002-1006 and the minimum demand windows 1102-1106 may be used separately or together to define a normal usage range for a resource. The maximum demand windows 1002-1006 combined with the minimum demand windows 1102-1106 provide a range for each point in time during a week where the usage of a resource is expected to be. According to one embodiment, the maximum demand windows 1002-1006 and the minimum demand windows 1102-1106 can be combined into one set of demand windows. For example, a single set of demand windows may have an upper limit value and a lower limit value within the same demand window. Each demand window may have a single or multiple start and/or end times. The demand windows 1002-1006, 1102-1106 may also be labeled according to names that make the windows meaningful to a human. For example, a demand window may be labeled as "Daytime", "Night time", or "Payroll batch process."

As will be understood in light of the present disclosure by one skilled in the art, the demand windows depicted above are simple illustrations of the present invention. Furthermore, the depicted repeating schedules 400, demand events 500, and predictive temporal profiles 600 have been kept simple to illustrate implementation of the method 300 of FIG. 3. Significant increased complexity in terms of the number of repeating schedule 400, demand events 500, and demand windows 1002-1006, 1102-1106 is possible and may be desirable or necessary in various implementations.

Exemplary operation of the resource usage apparatus 102 in defining normal resource usage will now be discussed from a user's point of view in relation to two exemplary scenarios.

According to a first exemplary scenario, a system administrator of a computing system 100 wishes to create a definition of normal resource usage for the processor resource 104. Using a GUI interface on the display 112 the administrator selects an option to create a new repeating schedule 400. The administrator may upload a file containing resource usage data 402 for the processor resource 104. The resource usage data 402 may represent what the administrator expects the resource usage of the processor resource 104 to look like during a normal week.

The uploaded file is received by the repeating schedule module 202 and then displayed graphically on the display 112 for the administrator to view. The GUI also displays a number of options to review and/or modify the resource usage data 402 which was uploaded. The administrator decides that one of the daily peaks was a little lower than normal and modifies it by selecting an option to redraw that peak. After redrawing the peak, the administrator indicates on which day of the week the resource usage data 402 should begin. The administrator reviews the details of the repeating schedule 400, such as start date, duration, and resource to which the resource usage data applies, and saves any changes. The final repeating schedule 400 is received by the repeating schedule module 202.

The administrator then selects an option in the GUI to create a new demand event 500. A window appears that allows the administrator to enter demand event details. The window includes a calendar to choose a date for the demand event 500 to begin. The administrator then enters the event in a manner similar to how events are entered in to PIM software. Microsoft Outlook and Google Calendar are exemplary PIM software that are well known in the art. The administrator selects a start time and a duration, or alternatively an end time. The administrator can also select reoccurrence options for the demand event 500. For example, the administrator sets the demand event to repeat every second Friday of every month.

The administrator then selects an option to create demand event resource usage data 502 for the demand event 500 within the GUI. The administrator draws a graph of the increased resource usage he or she expects to be used during the demand event 500. The administrator may also upload a file that contains actual resource usage data to represent the demand event resource usage 502. The administrator then reviews the details of the demand event 500 and also specifies a program that should be executed during the demand event 500. The demand event 500 is saved and received by the demand event module 204. The administrator then uploads a few more demand events 500 in a similar manner.

The administrator, now satisfied that the repeating schedule 400 and the demand events 500 reflect his or her expectations, selects an option to create a predictive temporal profile 600. The administrator is prompted for the desired length of the predictive temporal profile and the administrator specifies one month. The administrator is also prompted for a variation value. The default is a 10% resource usage variation and is accepted by the administrator without modification.

Using the repeating schedule 400 and the demand events 500 the temporal profile module 206 creates a predictive temporal profile 600, as described above. The predictive temporal profile 600 is displayed in the GUI on the display 112 where it can be viewed by the administrator. The GUI provides an option to convert the predictive temporal profile 600 to demand windows 902, 904 but the administrator is satisfied and saves the predictive temporal profile 600.

The second exemplary scenario is similar to the first exemplary scenario above except that the repeating schedule 400, demand events 500, and the predictive temporal profile include demand windows 702, 704, 802, 804, 902, 904. The administrator has the option of uploading or drawing the demand windows, or having them automatically created by the resource usage apparatus 102, for example based on resource usage data. The administrator can also modify or adjust the demand windows. The GUI on the display 112 provides windows where the data can be manipulated graphically and/or numerically.

Figure 12:
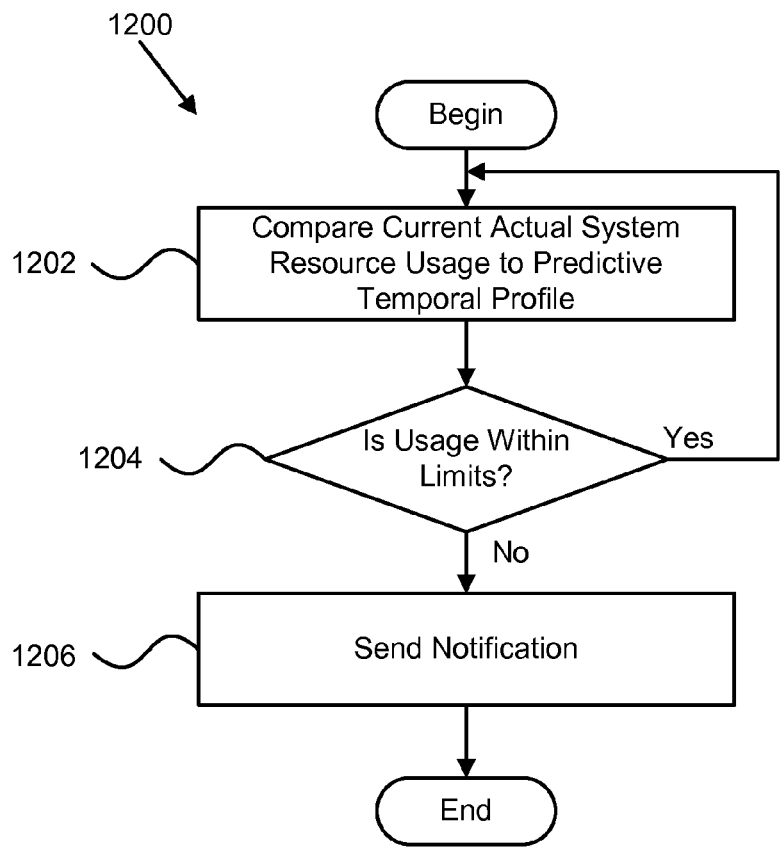
FIG. 12 is a schematic flow chart diagram illustrating one embodiment of a method for sending notifications based on a predictive temporal profile in accordance with the present invention.

According to the second exemplary scenario the GUI displays the predictive temporal profile 600 demand windows 902, 904 in a manner similar to that depicted in FIGS. 11 and 12. The administrator adjusts the demand windows by dragging the boundaries between the demand windows 0104, 1002, and 1006 and modifying the limit values within the windows. The administrator then saves the predictive temporal profile 600.

As mentioned above, the ability to accurately and easily define normal usage of system resources can lead to more powerful and useful automation of a computing system. Automation based on a predictive temporal profile 600 will now be discussed in relation to the remaining figures, FIGS. 12-19.

FIG. 12 is a flow chart depicting a method 1200 for sending notifications based on a predictive temporal profile 600. The method 1200 begins and the notification module 208 compares 1202 the current actual system resource usage to the predictive temporal profile 600. This comparison 1202 may be done by obtaining current actual resource usage data by logging the actual resource usage and comparing it to the temporal profile 600 at the corresponding time. For example, the notification module 208 may obtain actual resource usage data at noon on a particular Wednesday. The notification module 280 will compare it to the value of the temporal profile 600 for noon on that Wednesday.

The notification module 208 decides 1204 if the actual usage is within the expected varying limits of the predictive temporal profile 600. The expected varying limits may be the value of profile resource usage data 602 at the corresponding time, any value within an expected variation value of the profile resource usage data 602 at the corresponding time, or a range of values between a maximum demand window 1002 and a minimum demand window 1102 at the corresponding time. If the notification module 208 decides 1204 that the actual usage is within the expected varying limits the notification module 204 starts the method 1200 over. The method 1200 may start over immediately or may wait until starting over again. In one embodiment, the method 1200 waits one second before starting over. Thus, if the actual system resource usage goes as expected the method runs in a repeating loop. However, if the notification module 208 decides 1204 that the actual usage is not within the expected varying limits the notification module 204 sends 1206 a notification. The notification may be sent to a location where it is retrievable by a human such as an administrator. For example, the notification may be sent via email, text message, or other electronic messaging system. Alternatively, the notification may be saved to file or database.

Figure 13:
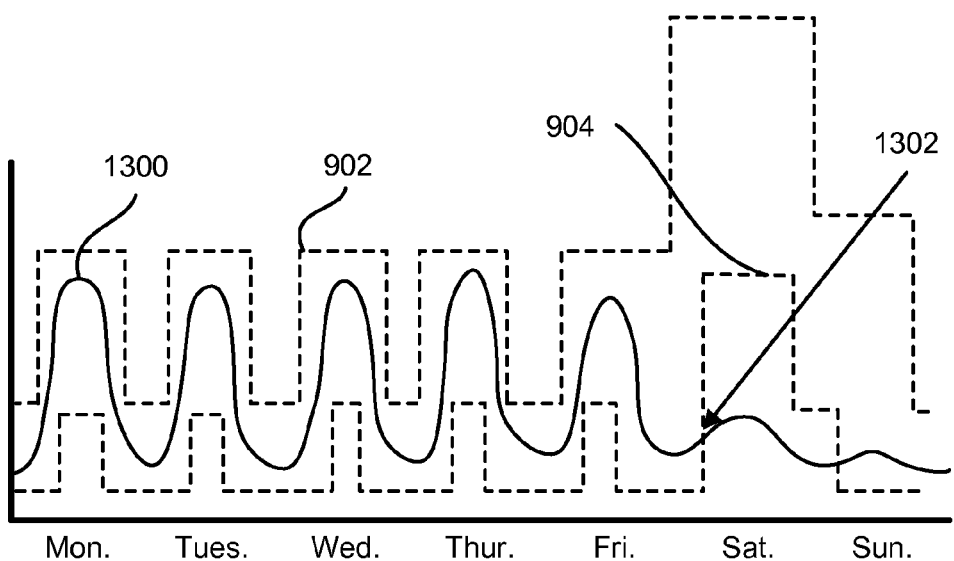
FIG. 13 is a graphical representation illustrating exemplary actual resource usage data and profile resource usage data in accordance with the present invention.

FIG. 13 depicts actual resource usage data 1300 as compared to a portion of a predictive temporal profile 600 to illustrate operation of the method 1200 for sending notifications. The actual resource usage data 1300 represents actual usage of the processor resource 104 by the computing system 100 during a time period corresponding to Week 4 of FIG. 9. By comparing 1202 the actual resource usage data 1300 to the maximum demand windows 902 and the minimum demand windows 904 it is clear that the actual resource usage data 1300 stays within expected varying limits prior to point 1302. Prior to the point 1302, the notification module decides 1204 that the actual resource usage data 1300 is within the expected varying limits and the method repeatedly starts over.

However, at point 1302 the minimum demand window 904 increases due to the expectation that a payroll process will be performed. The payroll process, for some reason, is not performed and this is reflected in that the actual resource usage data 1300 does not increase above the minimum demand window 904 as expected. Therefore the actual resource usage data 1300 at point 1302 is no longer within the varying limits. If the method 1200 for sending notifications is performed before the actual usage data 1300 rises to the proper limits, the notification module 204 will determine 1204 that the usage is not within expected varying limits and will send 1206 a notification. If the notification is sent 1206 to an administrator via text message, the administrator will immediately notice that something is not right and can get to work fixing it. The administrator may still be able to get the payroll process to run and perform all of its tasks by the following Monday. Thus, a problem may have been fixed before it had any detrimental effect.

In an alternate embodiment, the actual resource usage data 1300 may be compared 1202 to profile resource usage data 602. The notification module 208 may base its decision 1204 on whether or not the actual resource usage data 1300 is within an expected variation value of the profile resource usage data 602. If not, a notification is sent 1206.

The method 1200 of FIG. 12 provides accuracy setting up and receiving useful notifications. According to the scenario described above, the notification was sent when the actual resource usage data 1300 was within a very normal operation range. For example, the actual resource usage data had been in a similar every range every day for the whole week. However, the predictive temporal profile 600 allowed the notification module 208 to recognize that it was within an unexpected range for that specific Saturday. Thus, the predictive temporal profile 600 allows an administrator to receive notifications only when the actual resource usage data 1300 does not conform to the expected usage. This keeps an administrator from getting inundated with useless notifications.

Exemplary operation of the resource usage apparatus 102 in providing notifications based on the predictive temporal profile 600 will now be discussed from a user's point of view in relation to an exemplary scenario.

According a third scenario a predictive temporal profile 600 has already been created according to the method 300 for defining normal usage of a processor resource 104 on a computing system 100. The administrator wishes to receive notifications based on the predictive temporal profile 600. Viewing a GUI displayed on the display 112 the administrator selects an option to enable notifications. The administrator may select different options relating to the notifications, such as where the notification module 208 should send the notifications. He or she has the option to send the notification to various locations such as an email address, a phone number, or a log file. The administrator wishes to receive the notifications as text messages on a cell phone and selects a corresponding option and enters a cell phone number. The notification module 208 begins operating according to method 1200 of FIG. 12.

For a period of time, the actual usage of the processor resource 104 falls within the limits defined by the predictive temporal profile 600. For example, the actual usage may fall within 10% of the predictive temporal profile resource usage data 602. In another example, the actual usage may fall within demand windows 902, 904. No notifications are sent, indicating to the administrator that the processor resource 104 is being used as expected.

However, during the evening one day the computing system 100 undergoes a denial of service attack. The usage of the processor resource 104 exceeds the upper limit expected by the predictive temporal profile 600 but does not exceed the day time peak value. The administrator receives a text message indicating the usage of the processor resource 104 indicating that something unexpected is occurring. After viewing the text message the administrator looks into the issue and realizes that the system is undergoing a denial of service attack. The administrator works to keep the computing system 100 from being adversely affect by the attack and blocking the source(s) of the attack. The administrator successfully gets the computing system operating normally before the work day begins the next day. If the administrator had not received the notification, the computing system 100 would likely be down when employees arrived at work and a resulting loss in income for the company may have occurred.

Figure 14:
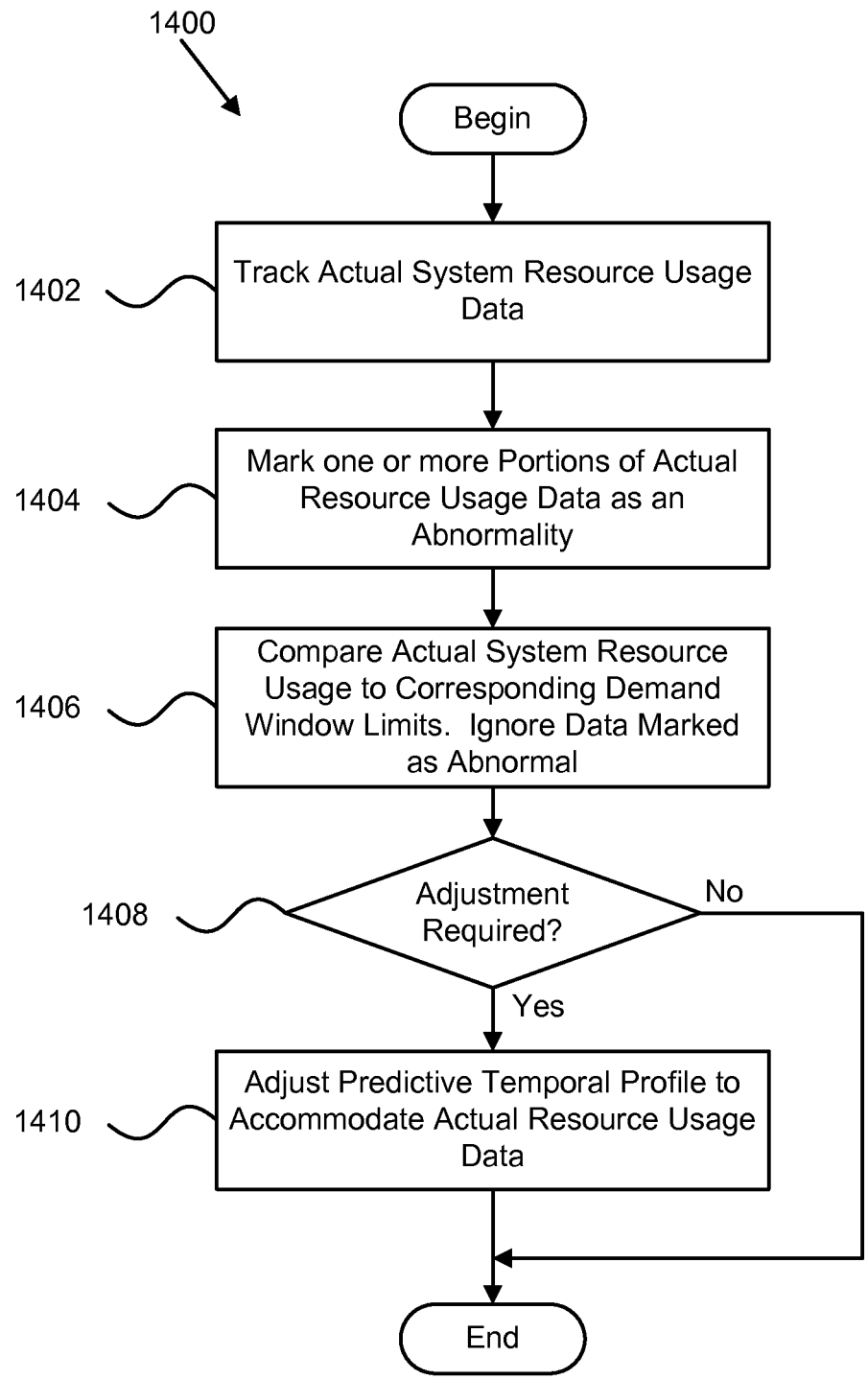
FIG. 14 is a schematic flow chart diagram illustrating one embodiment of a method for updating a predictive temporal profile in accordance with the present invention.

FIG. 14 depicts a method 1400 for updating a predictive temporal profile 600. The method 1400 may occur on any interval. For example, the method 1400 may be performed monthly to update the predictive temporal profile 600. The method 1400 may be performed automatically, based on a user request, or based on user approval. For example, the update module 210 may prompt a user for approval to perform an update. A user may deny a request, for example, because the past usage was abnormal and would not accurately predict what will happen in the future.

The method 1400 begins and actual system resource usage data is tracked 1402. In one embodiment, the tracking 1402 may be done by the update module 210, a notification module 208, code running on the computing system 100, or a separate apparatus. The data may be tracked 1402 by recording system usage at a regular time interval. According to another embodiment, the regular time interval is the same as the time interval for data points of the profile resource usage data 602.

The update module 210 marks 1404 one or more portions of the actual resource usage data as an abnormality. The update module 210 may mark 1404 portions of the actual resource usage data based on user input or according to a predefined operation. For example, the update module 210 may display the actual resource usage data on an interface to be viewed by a user. The update module 210 may provide a means for the user to mark portions of the actual resource usage data as abnormal. In one embodiment, the user is prompted to mark portions of the actual resource usage data as abnormal if they are not expected to repeat or if the user would like to be notified if they do repeat.

The update module 210 compares 1406 the actual system resource usage to the limits in the corresponding demand window but ignores data marked as an abnormality. In one embodiment, data marked as an abnormality will have no effect on the updating of the predictive temporal profile 600. Data not marked as an abnormality may be averaged with other non-abnormal data that corresponds to a similar time period.

In one embodiment, the method 1400 is performed monthly using the predictive temporal profile 600 of FIG. 9. The update module 210 may average the peak value of the actual resource usage data during each week day to determine how close, on average the week day peak comes to a demand window.

According to another exemplary embodiment, the method 1400 is performed every six months using the predictive temporal profile 600 of FIG. 6 and where the predictive temporal profile 600 further includes an expected variation value. The update module 210 may average the values of the actual resource usage data that correspond to each point on the predictive temporal profile 600 and compare it to the corresponding point on the predictive temporal profile 600.

Following the comparison 1406 the update module 210 checks 1408 to see if an adjustment is required. Adjustment may be required 1408 if non-ignored data does not fall within the varying limits defined by the predictive temporal profile 600. Adjustment may also be required 1408 if non-ignored data falls within the varying limits of the predictive temporal profile 600, but comes too close to those varying limits. How close is too close may be defined by a user or may be predefined in the update module 210. For example, the user or a predefined variable may specify that the actual resource usage data should not come within 5% of the limits of the predictive temporal profile. Alternatively or additionally, the user or a predefined variable may specify that actual resource usage data of a certain value should not occur within a half hour of a limit of the same value. If adjustment is required 1408 the update module 210 adjusts 1410 the predictive temporal profile 600 to accommodate the actual resource usage data and the method 1400 ends. If adjustment is not required 1408 the method 1400 ends.

Adjustment 1410 of the predictive temporal profile 600 may comprise modifying the profile resource usage data 602 or the demand windows 902, 904 of a predictive temporal profile. For example, the profile resource usage data 602 at a given point may be increased or decreased. Alternatively or additionally, the limit values of the demand windows 902, 904 may be selectively increased or decreased or the start times and durations of the demand windows 902, 904 may be adjusted. These adjustments 1410 may be done according to input by a user or by minimizing the area between the demand windows 902, 904 and the actual resource usage data while maintaining a proper distance from the actual resource usage data. Alternatively or additionally, the actual resource usage data may be averaged with the profile resource usage data 602 to create an updated predictive profile 600.

Figure 15:
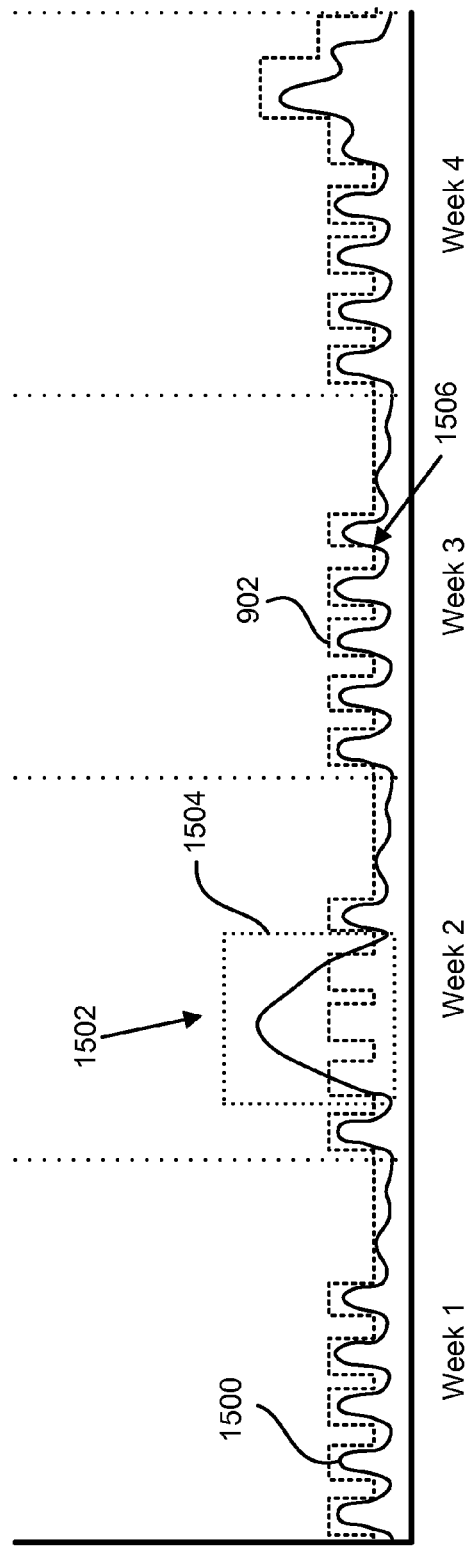
FIG. 15 is a graphical representation illustrating exemplary actual resource usage data and profile resource usage data in accordance with the present invention.

FIG. 15 depicts actual resource usage data 1500 used to update demand windows of a predictive temporal profile 600. The actual resource usage data 1500 represents data gathered about the computing system 100 over four weeks, corresponding to a four week predictive temporal profile, such as predictive temporal profiles 600 of FIGS. 6 and 9. The maximum demand windows 902 are shown to illustrate the maximum expected resource usage in one embodiment. The minimum demand windows 904 are not shown to maintain clarity. In one embodiment, the update module 210 may mark the feature 1502 as an abnormality based on user input, such as a box 1504 drawn by the user through a user interface to indicate abnormal data. The data within the box 1504 would be marked 1404 and ignored by the update module 210 when the predictive temporal profile 600 is updated.

With the abnormal feature 1502 marked 1404, it will be ignored when the update module 210 compares 1406 the actual resource usage data 1500 with the demand windows 902. When the actual resource usage data 1500 is compared 1406 the update module 210 may find that adjustment is required 1408, for example at point 1506. The update module 210 can adjust 1412 the demand windows 902 to accommodate point 1506 in various ways. For example, the point 1506 is at a boundary between the night time maximum demand window 1004 and the week day max demand window 1002. The point 1506 may be accommodated by either increasing the start time of the week day maximum demand window 1102 or increasing the limit of the night time maximum demand window 1104. Such adjustments may be made based on user input. Such adjustments may also be done based on an automated algorithm that adjusts 1410 the maximum demand windows 902 to minimize the area between the maximum demand windows 902 and the actual resource usage data 1500.

Exemplary operation of the resource usage apparatus 102 in updating a predictive temporal profile 600 will now be discussed from a user's point of view in relation to an exemplary scenario.

According a fourth scenario a predictive temporal profile 600 has already been created according to the method 300 for defining normal usage of a processor resource 104 on a computing system 100. The administrator wishes to be able to update the predictive temporal profile to more closely approximate actual usage of the processor resource 104 of the computing system 100. Viewing a GUI displayed on the display 112 the administrator selects an option to enable predictive temporal profile 600 updates. The administrator may select different options relating to the updates, such as how often the updates should occur, if the updates should be automatic or if they should require confirmation input from a user. The administrator selects the option that the updates should occur six month and that the updates require user input.

When the updates are enabled the actual usage of the processor resource 104 will be tracked. After the usage has been tracked for a month, the administrator receives an email notification that the update needs to be performed. The notification may take a variety of other forms including a message box in a program, an email message, or other methods of notification without limitation.

The administrator using a GUI on the display 112 selects an option to perform an update of the predictive temporal profile 600. Actual resource usage data 1500 for the processor resource 104 that was gathered over the month is graphically presented to on the display. The administrator recognizes an abnormality 1502 that resulted from a denial of service attack. The administrator does not want the abnormality 1502 to incorrectly skew the predictive temporal profile 600 and selects an option to mark a section of data as an abnormality. The administrator then proceeds to draw a box 1504 around the data that should be ignored in the update. The update module 210 marks 1404 the corresponding data as an abnormality. After further reviewing the actual resource usage data 1500 the administrator decides that the remaining portion accurately reflects normal system operation. He/she then selects an option to update the predictive temporal profile 600.

The administrator waits as the update module 210 compares 1406 the actual system resource usage 1500 to the corresponding demand window limits 902 and adjusts 1408 the predictive temporal profile 600 as necessary. After finishing this process the administrator is presented the adjusted temporal profile for approval. The administrator inspects the start and end times as well as limits of the demand windows 902. The administrator is satisfied that the modified demand windows 902 are satisfactory and selects an option to save the update.

Figure 16:
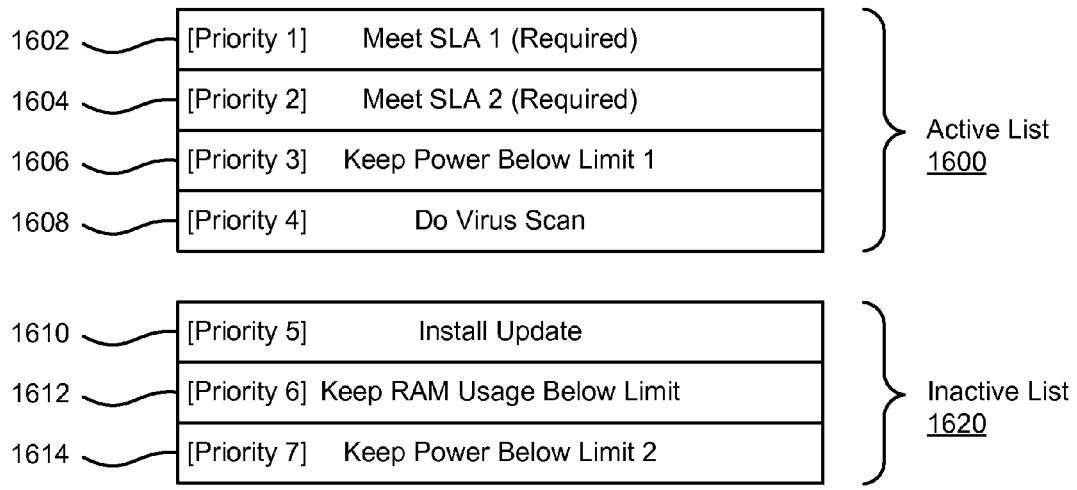
FIG. 16 is a schematic block diagram illustrating one embodiment of an arrangement of priorities on an active list and inactive list for automating priority management, in accordance with the present invention.
Figure 17:
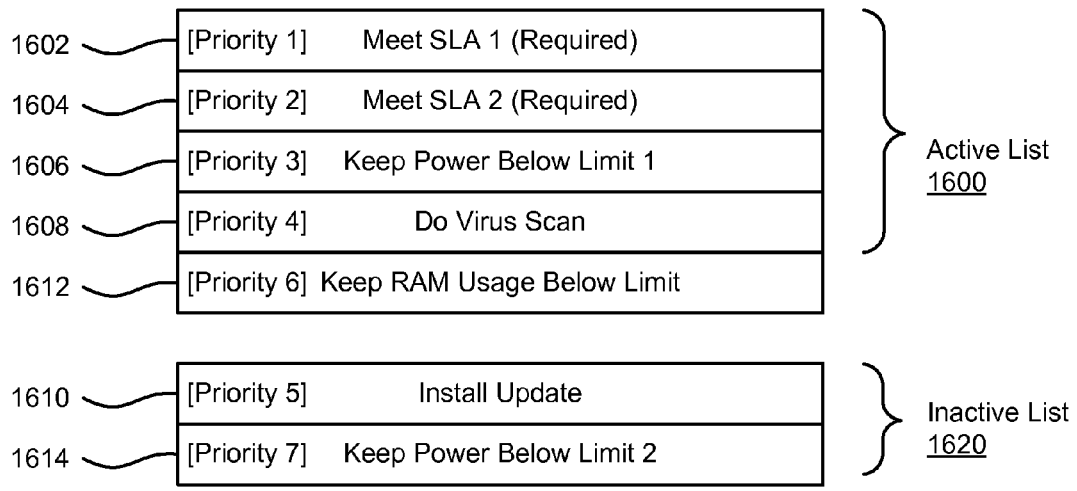
FIG. 17 is a schematic block diagram illustrating another embodiment of an arrangement of priorities on an active list and inactive list for automating priority management, in accordance with the present invention.

FIGS. 16-18 will now be discussed to illustrate automation of system operation and resource management decisions. FIG. 16 depicts priorities 1602-1614 which have been placed on an active list 1600 and an inactive list 1620. The active list 1600 contains priorities which the computing system 100 is actively trying to meet. The inactive list 1620 contains priorities which the computing system 100 is not actively trying to meet. For example, the computing system 100 may run code corresponding to a priority when it is on the active list 1600 but not when it is on the inactive list 1600. The priorities 1602-1614 may include requirements that must be met by a computing system. The priorities 1602-1614 may further include information about the priority, such as how long the priority takes to finish, the amount of system resources it requires, and the like. For example, a priority may include usage data similar to the demand event usage data 502 shown in FIG. 5.

In the depicted embodiment, the exemplary priorities 1602-1614 are ranked in order of importance. Priority 1 1602 is to meet service level agreement (SLA) 1. As used herein, an SLA is a level of service that a provider is obligated to provide to a recipient. For example, a web content provider may have an SLA to provide content to customers with a guaranteed response time. As another example, an internet service provider (ISP) may have an SLA to provide a connection to the internet with a minimum bandwidth available to a customer. SLA's may often be the top priority of a system that provides a service for customers. A number of other priorities 1604-1614 are also shown.

The priorities 1602-1614, according to one embodiment, are entered and ranked by a user, such as a system administrator. According to another embodiment, predefined priorities may be provided and ranked by the automation module 212. Each of the priorities 1602-1614 may be associated with executable code containing instructions on how to meet the respective priority. For example, priorities 1 and 2 1602, 1604 may have corresponding code which causes the system to meet SLA's 1 and 2. Priority 3 1606 may have corresponding code which shuts down one or more processors or blades to get power usage below limit 1. Priority 4 1608 may have corresponding instructions to start or stop a virus scan process. Priority 5 1610 may have corresponding instructions which start the installation of an update. Priority 6 1612 may have corresponding code that may power on a blade or server to provide more RAM. Alternately, priority 6 1612 may simply require that RAM usage is below a certain limit. This may result in the system not performing additional priorities because it would violate priority 6 1612 requirement for ram usage. Priority 7 1614 may have corresponding code which shuts down one or more processors or blades to get power usage below limit 2. The above priorities are exemplary only and do not necessarily reflect an actual ranking of priorities. In light of the present disclosure one skilled in the art will recognize numerous additional priorities which may be used.

The priorities 1602-1614 may be one time priorities that may be deleted as soon as they are achieved. For example, priority 5 1710 may be deleted as soon as the updates are installed. Alternatively other priorities such as priorities 1 and 2 1602, 1604 may be long standing priorities that may not be deleted for long periods of time. In one embodiment, an administrator can add additional priorities at any time. For example, an administrator may learn of an update that needs to be performed. He can add a new priority that defines the update. The update would then be performed according to the priority given by the administrator.

According to one exemplary embodiment, the automation module 212 automates on which list 1600, 1620 each of priorities 1602-1614 is located. For example, the automation module 212 may move the lowest ranked priority on the active list 1600 to the inactive list 1620 if the computing system 100 cannot meet all of the priorities on the active list 1600. The automation module 212 may also move the highest ranked priority on the inactive list 1620 to the active list 1600.

As an illustrative example, the automation module 212 may have the priorities 1602-1614 organized as shown in FIG. 16. The automation module may determine that it is meeting all the priorities on the active list 1600 and may be able to meet an additional priority. After examining the priorities 1610-1614 on the inactive list 1620, the automation module 212 may determine that the highest ranked priority on the inactive list 1620 that can be met is priority 6 1612. This may be the case if priority 5 1610 cannot be met at the current time but priority 6 1612 can be. This new organization, with priority 6 1612 on the active list and with priorities 5 and 7 remaining on the inactive list, is shown in FIG. 17.

FIG. 18 depicts a method 1800 for automating the meeting of priorities as described above. The method 1800 begins and the automation module 212 decides 1802 whether or not all of the priorities on the active list are being met. This may be done by comparing the requirements of each priority on the active list 1600 to actual activity on the system. For example, priority 3 1606 requires that power consumption be kept below limit 1. The system may compare the current actual power usage to limit 1 to decide if priority 3 1606 is being met.

If all priorities on the active list 1600 are being met 1802 the automation module 212 decides 1804 whether or not a priority on the inactive list 1620 can be met. If not, the method 1800 begins again. This decision 1804 can be made by comparing a priorities requirements and other information to a point in time on the predictive temporal profile 600, such as the current point in time. The automation module 212 may use the requirements for each priority as well as the information about duration and resource usage to decide 1804 if the priority can be accomplished within a valley of the profile usage data 602 or demand windows 902, 904.

For example, priority 5 1608 may include information that it requires a certain amount of resources and a few hours to finish. The automation module 212 may check to see if there are enough resources to accommodate priority 5 1608. If not, the decision 1804 is that priority 5 1608 cannot be met and the automation module may examine another priority. If there are enough resources to accommodate priority 5 1608 the automation module may check the predictive temporal profile 600 to see if there are enough resources for a long enough period of time. If so, the automation module 212 may decide that priority 5 1608 can be met.

If a priority on the active list can be met 1804 then the automation module 212 moves 1806 the highest ranked priority on the inactive list 1620 that can be met to the active list 1600.

If not all priorities on the active list 1600 are being met 1802, the automation module 212 decides 1808 whether or not the lowest ranked priority on the active list 1600 is required. This can be done by examining the information about the priority. For example, priorities 1 and 2 1602, 1604 are labeled as "required." If the lowest ranked priority on the active list 1600 is required 1808 a notification is sent 1810. The notification may alert an administrator that not all required priorities are being met at the current time and that the system demands attention. The notification may be sent 1810 by the automation module 212 or a notification module 208. If the lowest ranked priority on the active list 1600 is not required 1808, the lowest ranked priority on the active list 1600 is moved 1812 to the inactive list 1620 and the method 1800 begins again.

The method 1800 for automating the meeting of priorities provides significant power for a user to automate the operation of a computing system 100. The ranking of priorities allows a computing system 100 to make decisions as to what tasks or process should be performed with excess computing resources. Furthermore, the use of the predictive temporal profile 600 that accurately reflects what is expected to happen with the system allows the computing system 100 to find large enough time windows to actually finish tasks. Furthermore, use of the predictive temporal profile 600 can also allow the system to prepare for future peak usage so that really important priorities, such as an SLA will always be met. For example, meeting an SLA during a peak usage period may require the booting of an additional server. If the server takes an hour to boot, the computing system 100 may not be able to meet an SLA for a full hour if the expected future usage is not known, such as in methods that use averaging to automate system processes. The computing system 100 can use the predictive temporal profile to anticipate the peaks and start booting the server an hour prior to the expected peak and thus meet the SLA at all times.

As will be understood by one skilled in the art in light of the present disclosure, automations, such as the automations performed by the notification module 208, update module 210, and automation module 212 may modify the actual resource usage of a computing system. For example, the automation module 212 may start a priority during a low resource usage period. This may increase the usage of a system resource. If the notification module 208 is running at the same time, it may send a notification because the increased usage exceeds the expected varying limits. This may be an undesirable result.

To overcome such an undesirable result, the automation module 212 may, in addition to controlling what tasks are performed also temporarily adjust the predictive temporal profile 600. In one embodiment, the automation module modifies the predictive temporal profile 600 to include the increased usage that results from a priority. In another embodiment, the automation module 212 may indicate to the notification module that it should not send notifications for a period of time. The automation module 212 may alternatively or additionally mark actual resource usage data as abnormal if a priority is run. This would keep the update module 210 from using the data affected by a priority in updating the predictive temporal profile. Using a combination of the above notifications may allow an embodiment to include one or more of the additional modules 208-212.

Exemplary operation of the resource usage apparatus 102 in updating a predictive temporal profile 600 will now be discussed from a user's point of view in relation to an exemplary scenario.

According to a fifth scenario a predictive temporal profile 600 has already been created according to the method 300 for defining normal usage of a processor resource 104 on a computing system 100. The administrator wishes to automate tasks and priorities for the computing system 100. Viewing a GUI displayed on the display 112 the administrator selects an option to enable automation of system tasks and priorities. The administrator is prompted on the display 112 to enter and rank a list of priorities to be used in automation.

The administrator selects an option to add a priority and enters a name and brief description of the priority. The priority represents the most important priority for the system to meet and represents a SLA that his/her company is obligated to provide to customers. The administrator selects an option to make the priority required because this priority should always be met. The administrator selects an option to enter instructions for the computing system 100 to meet this priority. A window showing a variety of options for instructions for the priority is shown. The user selects an option to have the system automatically boot additional servers if needed to meet the priority. Other options are available and may be selected. The administrator is satisfied with the instructions and so indicates by selecting an option to save the instructions. The administrator reviews the priority, determines that it is set up correctly, and saves the priority.

The administrator selects an option to enter another priority. Once again, he enters a name and brief description of the priority. The priority represents a task that needs to be performed by the system, such as installing a software update. The administrator does not make the priority a requirement because it should only run when the system has enough available resources to perform the task. The administrator does select an option to make the task run one time and then be removed from the priority list. The administrator may indicate a file that should be run when the priority can be met. The administrator also selects an option to be notified if the priority does not run with a desired time period, such as one week. The administrator reviews the priority and saves it.

The administrator adds a number of priorities in a similar manner. After being satisfied that all desired priorities have been entered the administrator double checks each priorities ranking. The administrator adjusts the ranking of various priorities by entering a number corresponding to its rank and/or dragging and dropping priorities in the proper order in a GUI. The administrator double checks the settings and, satisfied, saves the priorities. After saving, the automation module 212 begins managing which priorities are being met.

The priorities are met by the computing system 100 according to the method shown in FIG. 18. When the system has extra resources, the system meets a larger number of the priorities. When the system has limited resources, it may meet only the required priority. The automation module 212 is able to make intelligent management decisions because it knows how the administrator ranks the priorities and it also knows what is expected to happen and when. The system can decide to initiate a priority that takes some time by comparing how long a low usage window will last, according to the predictive temporal profile 600. At other times, the resource usage drops to a low level, but the automation module 212 does move additional priorities to the active list because there is not sufficient time to complete them.

At one point, the system becomes overloaded and cannot meet even the highest ranked priority, the SLA. The automation module 212 sends a notification to the administrator about the problem and boots another server. The administrator is able to evaluate the system and realize that the overload came from a high number of unexpected valid customer requests. This may assist the administrator in knowing the needs of the system at peak usage times and help the administrator plan to upgrade or expand the computing system 100. The administrator can rest assured that the automation module will handle the priorities according to his/her expectations freeing him from time wasted in monitoring the system and manually running tasks.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method for defining normal usage of a computing system resource, the method comprising:
receiving a repeating schedule representing system usage of one or more computing system resources;
receiving one or more demand events that will, at a future time, affect the system usage of the one or more computing system resources;
automatically creating a predictive temporal profile that represents the system usage of the one or more computing system resources, the predictive temporal profile created from information comprising the repeating schedule and the one or more demand events;
displaying the predictive temporal profile on a display for a user to review; and
sending a notification when actual system resource usage does not follow the predictive temporal profile, wherein the notification is retrievable by a user.

2. The method of claim 1, wherein the predictive temporal profile comprises varying limits that define a range of expected usage for the one or more computing system resources.

3. The method of claim 1, wherein reviewing the predictive temporal profile comprises one or more of:
viewing a graphical representation of the predictive temporal profile;
adjusting the varying limits of the predictive temporal profile; and confirming that the predictive temporal profile may be used as a definition of normal usage of the one or more computing system resources.

4. The method of claim 2, wherein the varying limits comprise one or more of:
resource usage data and an expected variation value; and
two or more demand windows.

5. The method of claim 4, wherein the demand windows comprise one or more of:
an upper limit; and
a lower limit.

6. The method of claim 1, wherein the predictive temporal profile comprises varying limits that define a range of expected usage for the one or more computing system resources and wherein not following the predictive temporal profile comprises not falling within the varying limits.

7. The method of claim 1, the method further comprising updating the predictive temporal profile based on actual system resource usage data.

8. The method of claim 7, the method further comprising marking one or more portions of the actual system resource usage data as an abnormality according to the user input, wherein the resource usage data marked as an abnormality is not used to update the predictive temporal profile.

9. The method of claim 1, the method further comprising automatically applying the predictive temporal profile to resource management decisions for the computing system.

10. The method of claim 9, wherein automatically applying the predictive temporal profile to resource management decisions comprises causing a computing system to meet one or more priorities based on a priority rank and the predictive temporal profile.

11. The method of claim 1, wherein the repeating schedule and the one or more demand events are displayed on the display for confirmation by a user.

12. The method of claim 1, wherein the repeating schedule comprises repeating schedule resource usage data and at least one of the demand events comprise demand event resource usage data, the repeating schedule resource usage data and the demand event resource usage data comprising one or more of:
actual resource usage data;
graphical data drawn by a user; and
numerical data created by a user.

13. The method of claim 1, wherein a user interface is displayed on the display, the user interface allowing a user to perform one or more of:
submit, view, and modify a repeating schedule;
submit, view, and modify a demand event;
enable notifications;
enable updates of the predictive temporal profile; and
enable automation of meeting priorities.

14. A system for defining normal resource usage of a computing system, the system comprising:
one or more computing system resources;
a display; and
a resource usage apparatus, the resource usage apparatus comprising
a repeating schedule module that receives a repeating schedule representing system usage of one or more computing system resources of a computing system;
a demand event module that receives one or more demand events that will, at a future time, affect the system usage of the one or more computing system resources;
a temporal profile module that automatically creates a predictive temporal profile that represents the system usage of the one or more computing system resources, the predictive temporal profile created from resource usage information comprising the repeating schedule and the one or more demand events, wherein the temporal profile module updates the predictive temporal profile based on actual system resource usage data; and
a display module that displays the predictive temporal profile for a user to review.

15. The system of claim 14, wherein the resource usage apparatus further comprises a notification module that sends a notification when actual system resource usage does not fall within the varying limits of the predictive temporal profile, wherein the notification is retrievable by a user.

16. The system of claim 14, wherein the one or more demand events represent one or more of:
a sale;
a marketing event;
scheduled maintenance;
a scheduled update;
a scheduled upgrade;
a holiday; and
a scheduled task.

17. The system of claim 14, wherein the one or more computing system resources comprises one or more of:
a processor;
a network connection;
random access memory; and
a hard drive or other storage device.

18. The system of claim 14, wherein a user interface is displayed on the display, the user interface allowing a user to perform one or more of:
submit, view, and modify a repeating schedule;
submit, view, and modify a demand event;
enable notifications;
enable updates of the predictive temporal profile; and
enable automation of meeting priorities.

19. A computer program product comprising a non-transitory computer readable medium having computer usable program code executable to perform operations for defining normal resource usage of a computing system, the operations of the computer program product comprising:
receiving a repeating schedule representing system usage of one or more computing system resources;
receiving one or more demand events that will, at a future time, affect the system usage of the one or more computing system resources;
automatically creating a predictive temporal profile that represents the system usage of the one or more computing system resources, the predictive temporal profile created from information comprising the repeating schedule and the one or more demand events;
displaying the predictive temporal profile on a display for a user to review; and
automatically applying the predictive temporal profile to resource management decisions for the computing system.

* * * * *